United States Patent
Shimoda

(10) Patent No.: US 8,842,344 B2
(45) Date of Patent: Sep. 23, 2014

(54) IMAGE SENSOR UNIT AND IMAGE READER

(75) Inventor: Shuuichi Shimoda, Saitama (JP)

(73) Assignee: Canon Components, Inc. (JP)

( * ) Notice: Subject to any disclaimer, the term of this patent is extended or adjusted under 35 U.S.C. 154(b) by 231 days.

(21) Appl. No.: 13/333,751

(22) Filed: Dec. 21, 2011

(65) Prior Publication Data

US 2012/0154876 A1 Jun. 21, 2012

(30) Foreign Application Priority Data

Dec. 21, 2010 (JP) ................................ 2010-284035
Oct. 27, 2011 (JP) ................................ 2011-236415

(51) Int. Cl.
*H04N 1/04* (2006.01)
*H04N 1/00* (2006.01)
*H04N 1/12* (2006.01)
*H04N 1/031* (2006.01)
*H04N 1/028* (2006.01)
*H04N 1/193* (2006.01)

(52) U.S. Cl.
CPC ...... *H04N 1/0318* (2013.01); *H04N 2201/0315* (2013.01); *H04N 2201/03145* (2013.01); *H04N 2201/03141* (2013.01); *H04N 1/00087* (2013.01); *H04N 2201/03183* (2013.01); *H04N 1/0005* (2013.01); *H04N 1/02835* (2013.01); *H04N 1/12* (2013.01); *H04N 1/193* (2013.01); *H04N 1/00013* (2013.01); *H04N 2201/03112* (2013.01); *H04N 2201/03125* (2013.01); *H04N 1/00063* (2013.01); *H04N 2201/03129* (2013.01); *H04N 1/0009* (2013.01); *H04N 1/00031* (2013.01); *H04N 1/00045* (2013.01)
USPC ............................ 358/474; 358/448; 358/461

(58) Field of Classification Search
None
See application file for complete search history.

(56) References Cited

U.S. PATENT DOCUMENTS

| | | | |
|---|---|---|---|
| 5,119,232 | A | 6/1992 | Daley et al. |
| 5,166,832 | A | 11/1992 | Zychowicz |
| 5,182,445 | A | 1/1993 | Yamashita |
| 5,263,077 | A | 11/1993 | Cowan et al. |

(Continued)

FOREIGN PATENT DOCUMENTS

| | | |
|---|---|---|
| EP | 0 844 784 A2 | 11/1997 |
| EP | 0 844 784 A2 | 5/1998 |

(Continued)

OTHER PUBLICATIONS

Extended European Search Report for EP 11194502.8, mail date Dec. 4, 2012.

(Continued)

*Primary Examiner* — Dung Tran
(74) *Attorney, Agent, or Firm* — Rossi, Kimms & McDowell LLP

(57) ABSTRACT

An illumination device includes a light guide made of plastic, and a light source including a light emitting element whose dominant wavelength is a light emission wavelength in an infrared region, and identifies a banknote. White reference plates are provided at positions that are at opposite ends of a rod lens array and cover respective areas external to an image region across the banknote. A correction coefficient is acquired by calculation. The calculation is made by correcting an illuminance such that IR correction data is substantially identical to IR reference data preliminarily stored in a memory circuit in a signal processor on the basis of IR white reference data representing a white reference illuminance generated from light reflected from the white reference plates. The correction coefficient is used for correcting IR image data when the banknote is read.

12 Claims, 15 Drawing Sheets

(56) References Cited

U.S. PATENT DOCUMENTS

| | | | |
|---|---|---|---|
| 5,673,122 | A | 9/1997 | Omori |
| 5,780,840 | A * | 7/1998 | Lee et al. .................. 250/208.1 |
| 5,864,408 | A | 1/1999 | Kumashiro |
| 5,953,133 | A | 9/1999 | Fujimiya et al. |
| 6,094,281 | A * | 7/2000 | Nakai et al. .................. 358/512 |
| 6,166,832 | A | 12/2000 | Fujimoto |
| 6,426,807 | B1 | 7/2002 | Kawai et al. |
| 6,486,974 | B1 * | 11/2002 | Nakai et al. .................. 358/1.9 |
| 6,538,243 | B1 * | 3/2003 | Bohn et al. ................ 250/208.1 |
| 6,724,503 | B1 | 4/2004 | Sako et al. |
| 6,791,721 | B1 * | 9/2004 | Konogaya et al. ............ 358/474 |
| 6,892,945 | B2 * | 5/2005 | Shishido ...................... 235/454 |
| 7,042,598 | B2 | 5/2006 | Payne |
| 7,190,493 | B2 | 3/2007 | Maki et al. |
| 7,284,891 | B2 | 10/2007 | Saito |
| 7,538,911 | B2 | 5/2009 | Sakurai et al. |
| 7,593,143 | B2 | 9/2009 | Herloski |
| 7,722,223 | B2 | 5/2010 | Saito et al. |
| 7,760,403 | B2 | 7/2010 | Sakurai |
| 7,796,310 | B2 | 9/2010 | Hasegawa et al. |
| 7,859,726 | B2 | 12/2010 | Endo et al. |
| 8,018,630 | B2 | 9/2011 | Herloski |
| 8,049,937 | B2 | 11/2011 | Saito |
| 8,228,567 | B2 | 7/2012 | Kim |
| 8,310,737 | B2 | 11/2012 | Nagao et al. |
| 8,422,091 | B2 * | 4/2013 | Yamaguchi .................. 358/474 |
| 8,467,108 | B2 * | 6/2013 | Shimatani .................... 358/461 |
| 2002/0114152 | A1 | 8/2002 | Fujino et al. |
| 2005/0150956 | A1 | 7/2005 | Ikeda et al. |
| 2005/0195618 | A1 | 9/2005 | Uemura et al. |
| 2006/0008295 | A1 | 1/2006 | Kohchi et al. |
| 2006/0152942 | A1 | 7/2006 | Saito et al. |
| 2007/0285740 | A1 | 12/2007 | Onishi et al. |
| 2008/0068682 | A1 | 3/2008 | Morikawa |
| 2008/0112017 | A1 | 5/2008 | Nagasaka |
| 2009/0003000 | A1 | 1/2009 | Saito et al. |
| 2009/0027743 | A1 | 1/2009 | Han |
| 2009/0080213 | A1 | 3/2009 | Onishi et al. |
| 2009/0127569 | A1 | 5/2009 | Sawada et al. |
| 2009/0218525 | A1 | 9/2009 | Ikeda et al. |
| 2009/0294630 | A1 | 12/2009 | Saito et al. |
| 2010/0046045 | A1 | 2/2010 | Nagao et al. |
| 2010/0231987 | A1 | 9/2010 | Takeuchi |
| 2012/0287484 | A1 | 11/2012 | Shimoda et al. |
| 2013/0009037 | A1 | 1/2013 | Takahashi |
| 2013/0038912 | A1 * | 2/2013 | Horiguchi et al. ............ 358/474 |
| 2013/0038913 | A1 | 2/2013 | Shimoda et al. |
| 2013/0038914 | A1 | 2/2013 | Yoshida et al. |
| 2013/0181311 | A1 | 7/2013 | Sugiyama |
| 2013/0265617 | A1 | 10/2013 | Murakami et al. |

FOREIGN PATENT DOCUMENTS

| | | |
|---|---|---|
| EP | 1 049 055 A2 | 4/2000 |
| EP | 1 049 055 A2 | 11/2000 |
| EP | 1 471 472 A2 | 4/2004 |
| EP | 1 471 472 A2 | 10/2004 |
| EP | 2 246 825 A1 | 4/2009 |
| EP | 2 134 071 A2 | 12/2009 |
| EP | 2 246 825 A1 | 11/2010 |
| JP | 4-150454 A | 5/1992 |
| JP | 8-223417 A | 8/1996 |
| JP | 09-214675 A | 8/1997 |
| JP | 10-285330 A | 10/1998 |
| JP | 11-75015 A | 3/1999 |
| JP | 11-084544 A | 3/1999 |
| JP | 2000-324308 A | 11/2000 |
| JP | 2001-005122 A | 1/2001 |
| JP | 2001-223852 A | 8/2001 |
| JP | 2001-272677 A | 10/2001 |
| JP | 2003-037717 A | 2/2003 |
| JP | 2003-046726 A | 2/2003 |
| JP | 2003-281913 A | 10/2003 |
| JP | 2004-146870 A | 5/2004 |
| JP | 2005-198106 A | 7/2005 |
| JP | 2005-223424 A | 8/2005 |
| JP | 2006-311232 A | 11/2006 |
| JP | 3885088 B2 | 11/2006 |
| JP | 2007-116590 A | 5/2007 |
| JP | 2007-194797 A | 8/2007 |
| JP | 2007-300536 A | 11/2007 |
| JP | 2008-42425 A | 2/2008 |
| JP | 2008-112301 A | 5/2008 |
| JP | 2008124788 A | 5/2008 |
| JP | 2009-053316 A | 3/2009 |
| JP | 2009-086488 A | 4/2009 |
| JP | 2010-136061 A | 6/2010 |
| JP | 2010-213039 A | 9/2010 |
| JP | 2011-124741 A | 6/2011 |
| WO | 97/23991 A1 | 7/1997 |
| WO | 2006/137263 A1 | 12/2006 |
| WO | 2007/077760 A1 | 7/2007 |
| WO | 2008/013234 A1 | 1/2008 |

OTHER PUBLICATIONS

Japanese Office Action for corresponding JP 2011-236415, mail date Nov. 13, 2012.

Specification and drawing for related co-pending U.S. Appl. No. 13/328,553, filed Dec. 16, 2011.

Specification and drawing for related co-pending U.S. Appl. No. 13/338,418, filed Dec. 28, 2011.

Specification and drawing for related co-pending U.S. Appl. No. 13/315,747, filed Dec. 9, 2011.

Office Action issued in Corresponding Japanese Patent Application No. 2010-282128 dated Nov. 6, 2012. Cited in related co-pending U.S. Appl. No. 13/328,553.

International Search Report for PCT/JP2010/069500, mail date Nov. 30, 2010. Cited in related U.S. Appl. No. 13/315,747.

Japanese Office Action for JP 2012-247653, mail date Dec. 11, 2012. Cited in related U.S. Appl. No. 13/315,747.

Office Action issued in corresponding Chinese Application No. 201110431991.5 dated Jan. 3, 2014.

Chen Hong et al. "A color correction method based on standard white board" Journal of Agricultural University of Hebei, Jul. 2007. English Abstract provided.

Extended European Search Report issued in EP12167240 dated Nov. 21, 2012. Related co-pending U.S. Appl. No. 13/315,747.

International Search Report issued in PCT/JP2010/069500 dated Nov. 30, 2010. English Abstract Provided. Related co-pending U.S. Appl. No. 13/315,747.

Japanese Office Action Issued in JP2012-087401 dated Apr. 30, 2013. English Summary of the Office Action Provided. Related co-pending U.S. Appl. No. 13/315,747.

Japanese Office Action issued in JP2012-247653, related co-pending U.S. Appl. No. 13/315,747. (JP Office Action dated Dec. 11, 2012).

Japanese Office Action Issued in JP2010-293227 dated Dec. 11, 2012. English Summary of the Office Action Provided. Related co-pending U.S. Appl. No. 13/315,747.

Japanese Office Action Issued in JP2012-163536 dated Sep. 17, 2013. English Summary of the Office Action Provided. Related co-pending U.S. Appl. No. 13/315,747.

Korean Office Actioan Issued in KR 10-2012-49430 dated Jun. 27, 2013. English Summary of the Office Action Provided. Related co-pending U.S. Appl. No. 13/315,747.

Extended European Search Report issued in EP12179608.0 dated Nov. 21, 2012. Related co-pending U.S. Appl. No. 13/315,747.

* cited by examiner

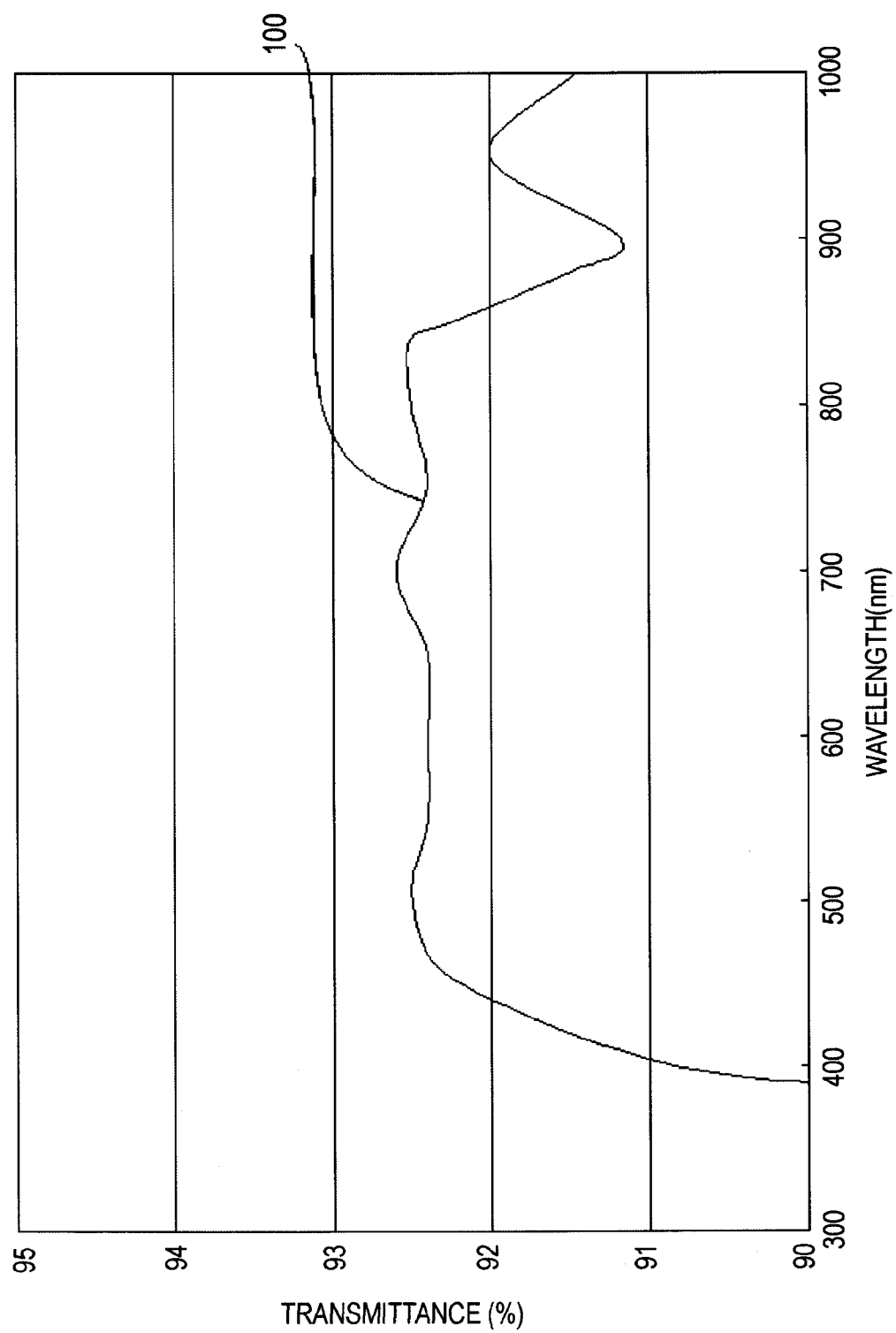

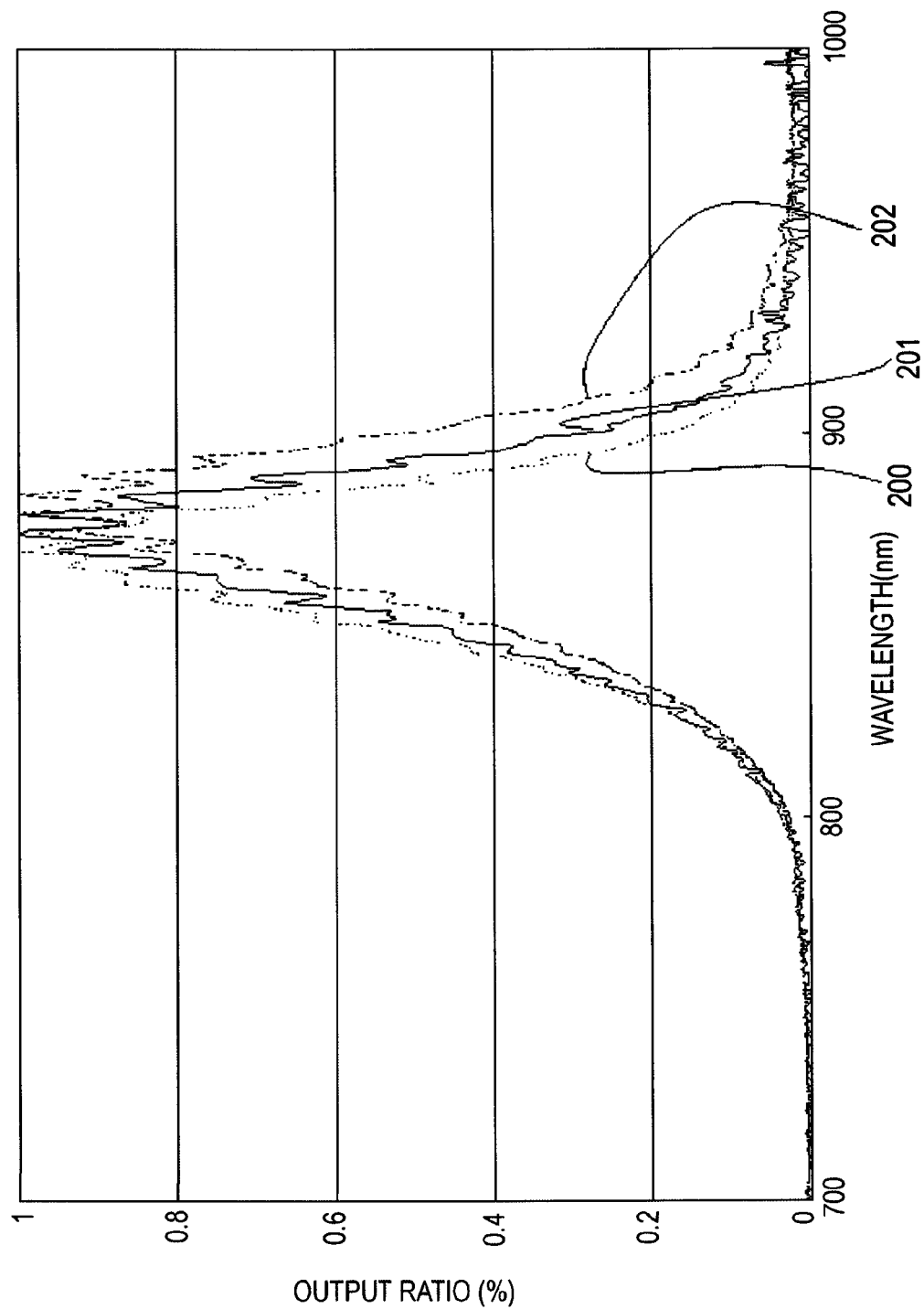

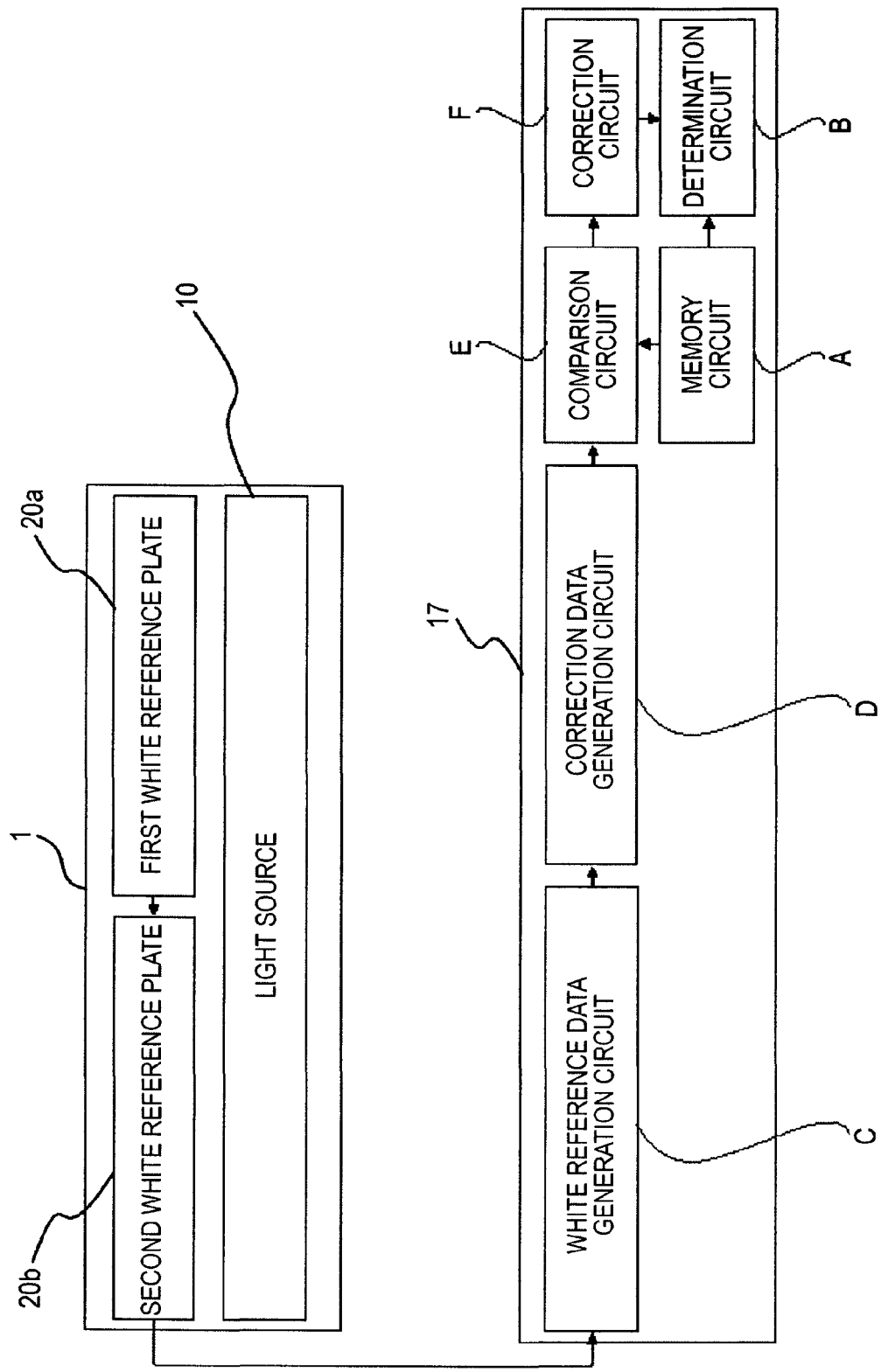

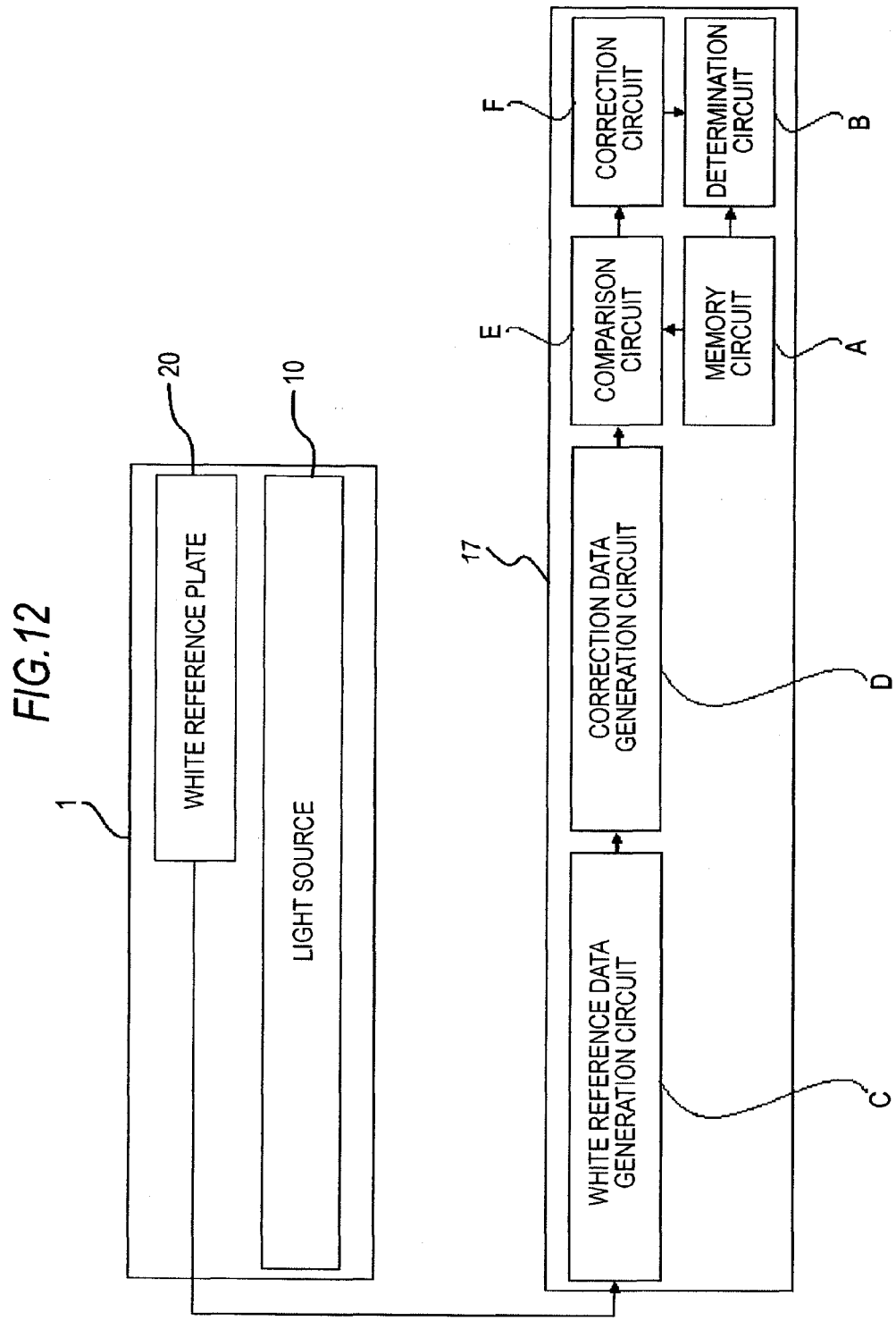

IMAGE SENSOR UNIT AND IMAGE READER

CROSS-REFERENCE TO RELATED APPLICATIONS

This application is based upon and claims the benefit of priority of the prior Japanese Patent Application No. 2010-284035, filed on Dec. 21, 2010 and the Japanese Patent Application No. 2011-236415, filed on Oct. 27, 2011, the entire contents of which are incorporated herein by reference.

BACKGROUND OF THE INVENTION

1. Field of the Invention

The present invention relates to an image sensor unit and an image reader using the image sensor unit.

2. Description of the Related Art

As an image reader, an apparatus for reading a print pattern of a paper sheet has been proposed.
Patent Document 1: Japanese Laid-open Patent Publication No. 2003-46726

As described in Patent Document 1, the image sensor unit in the image reader (apparatus for reading a print pattern of a paper sheet) has a configuration that emits light having a light emission wavelength in an infrared region in order to identify authenticity of a banknote in identification of a paper sheet.

This is because, printing on surfaces of an authentic banknote provides a region where images to be acquired under visible light and infrared light are different from each other.

In this case, since plastic is more inexpensive in view of cost than optical glass, highly light transmissive plastic, such as acrylic and polycarbonate, is typically used.

Incidentally, for instance, plastics have respective regions with large variation in absorptivity of light of emission wavelengths in an infrared region. In acrylic, the region is in light emission wavelengths in a near infrared region from 780 to 1000 nm. This region is used for determining authenticity of a banknote (see FIG. 3).

On the other hand, in an LED used as a light source, temperature variation causes variation in light emission wavelength (hereinafter, referred to as temperature shift). For instance, in a case of using a typical LED that is inexpensive in cost and emits light of light emission wavelengths in an infrared region and have a peak light emission wavelength in a range from 800 to 1000 nm, variation in ambient temperature causes a temperature shift in light emission wavelength (see FIG. 4).

Thus, there is a possibility that, in a certain ambient temperature, a region with large variation in absorptivity of light of emission wavelengths in the infrared region owing to plastic matches with a region of temperature shift of the light emission wavelength owing to temperature variation, thereby causing instability in illuminance of light of the emission wavelengths in the infrared region. This in turn causes instability in an amount of light reflected from a reading surface of a paper sheet during reading, which affects determination of authenticity.

SUMMARY OF THE INVENTION

The present invention is made in view of these situations. It is an object of the present invention to provide an image sensor unit and an image reader that are capable of acquiring stable image data even if variation in ambient temperature causes a temperature shift in light emission wavelength and in turn causes variation in luminance.

An image sensor unit of the present invention includes: a light source; a light guide that guides light from the light source and linearly emits light to a subject to be illuminated; and an image-forming element that forms an image of light from the illuminated subject on a photoelectric conversion element, the unit generating image data, wherein the light guide is made of a material having a region in which transmittance is not constant with respect to wavelength, the light source includes light emission wavelengths in the region of the light guide in which transmittance is not constant and/or in proximity to the region in which transmittance is not constant, and the unit further includes: memory means for storing reference data to be a reference illuminance of an image region across the illuminated subject; white reference means provided at positions that are at opposite ends of the image-forming element in a longitudinal direction and cover respective areas external to the image region across the illuminated subject; white reference data generation means for reading light reflected from the white reference means by the photoelectric conversion element and for generating white reference data that represents a white reference illuminance; correction data generation means for generating correction data that represents a white reference illuminance of the image region across the illuminated subject on the basis of the white reference data; comparison means for calculating a correction coefficient from the correction data and the reference data; and correction means for correcting the image data on the basis of the correction coefficient.

An image sensor unit of the present invention includes: a light source; a light guide that guides light from the light source and linearly emits light to a subject to be illuminated; and an image-forming element that forms an image of light from the illuminated subject on a photoelectric conversion element, the unit generating image data, wherein the light guide is made of a material having a region in which transmittance is not constant with respect to wavelength, the light source includes light emission wavelengths in the region of the light guide in which transmittance is not constant and/or in proximity to the region in which transmittance is not constant, and the unit further includes: memory means for storing plural pieces of reference data to be a reference illuminance of an image region across the illuminated subject according to respective temperature conditions; white reference means provided at positions that are at opposite ends of the image-forming element in a longitudinal direction and cover respective areas external to the image region across the illuminated subject; white reference data generation means for reading light reflected from the white reference means by the photoelectric conversion element and for generating white reference data that represents a white reference illuminance; correction data generation means for calculating a correction coefficient for the image region across the illuminated subject by adopting reference data capable of being approximated to the plural pieces of reference data as correction data that represents a white reference illuminance on the basis of the white reference data; and correction means for correcting the image data on the basis of the correction coefficient.

An image sensor unit of the present invention includes: a light source; a light guide that guides light from the light source and linearly emits light to a subject to be illuminated; and an image-forming element that forms an image of light from the illuminated subject on a photoelectric conversion element, the unit generating image data, wherein the light guide is made of a material having a region in which transmittance is not constant with respect to wavelength, the light source includes light emission wavelengths in the region of the light guide in which transmittance is not constant and/or in proximity to the region in which transmittance is not constant, and the unit further includes: memory means for storing reference data to be a reference illuminance of an image region across the illuminated subject; white reference means provided at a position that is at an opposite side end of the image-forming element in a longitudinal direction away from the light source and covers an area external to the image region across the illuminated subject; white reference data generation means for reading light reflected from the white reference means by the photoelectric conversion element and for generating white reference data that represents a white reference illuminance; correction data generation means for generating correction data that represents a white reference illuminance of the image region across the illuminated subject on, the basis of the white reference data; comparison means for calculating a correction coefficient from the correction data and the reference data; and correction means for correcting the image data on the basis of the correction coefficient.

An image sensor unit of the present invention includes: a light source; a light guide that guides light from the light source and linearly emits light to a subject to be illuminated; and an image-forming element that forms an image of light from the illuminated subject on a photoelectric conversion element, the unit generating image data, wherein the light guide is made of a material having a region in which transmittance is not constant with respect to wavelength, the light source includes light emission wavelengths in the region of the light guide in which transmittance is not constant and/or in proximity to the region in which transmittance is not constant, and the unit further includes: memory means for storing plural pieces of reference data to be a reference illuminance of an image region across the illuminated subject according to respective temperature conditions; white reference means provided at a position that is at an opposite side end of the image-forming element in a longitudinal direction away from the light source and covers an area external to the image region across the illuminated subject; white reference data generation means for reading light reflected from the white reference means by the photoelectric conversion element and for generating white reference data that represents a white reference illuminance; correction data generation means for calculating a correction coefficient for the image region across the illuminated subject by adopting reference data capable of being approximated to the plural pieces of reference data as correction data that represents a white reference illuminance on the basis of the white reference data; and correction means for correcting the image data on the basis of the correction coefficient.

An image reader of the present invention includes the image sensor unit.

BRIEF DESCRIPTION OF THE DRAWINGS

FIG. 3 is a partially enlarged diagram showing spectral transmittance of acrylic;

FIG. 4 is a diagram showing a temperature shift of light emission wavelengths of an LED;

FIG. 6 is a block diagram showing a configuration of a signal processor 17;

FIG. 12 is a block diagram showing another configuration of a signal processor 17;

DETAILED DESCRIPTION OF THE PREFERRED EMBODIMENTS

Embodiments of the present invention will hereinafter be described in detail.

Figure 1:
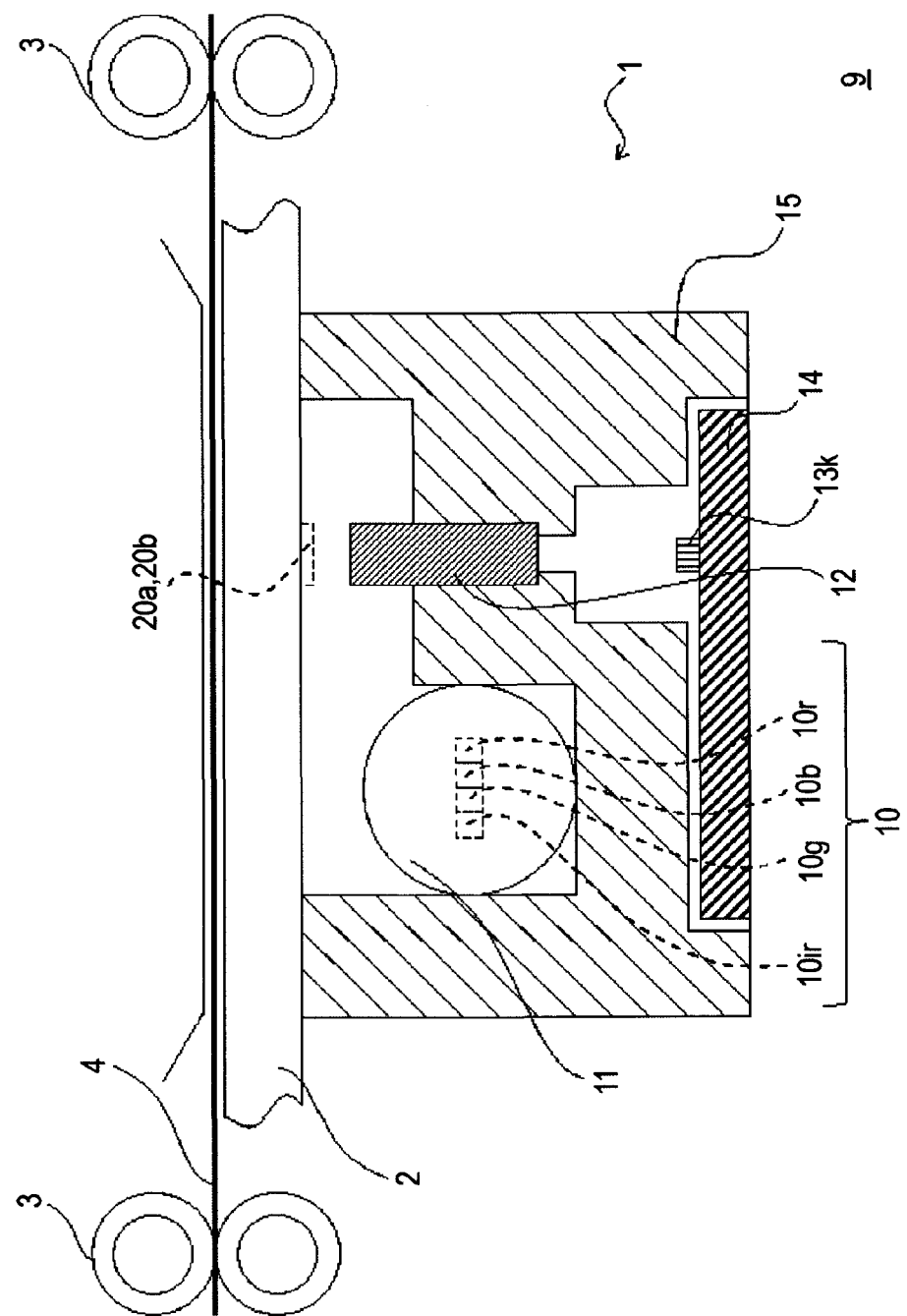
FIG. 1 is a sectional view showing a structure of a sheet feed image scanner (image reader 9), to which the present invention is applicable, taken at a substantially center part in a subscanning direction.

FIG. 1 is a sectional view showing a structure of a so-called sheet feed image scanner (image reader 9), to which the present invention is applicable, taken at a substantially center part in a subscanning direction.

Reference numeral 1 denotes an image sensor unit. For instance, a contact image sensor (CIS) unit is employed as the image sensor unit 1.

Reference numeral 2 denotes a cover glass that is a transparent plate made of glass and for protecting the image sensor unit 1 from entrance of dust.

The material of the cover glass 2 is not limited to glass. Instead, the material may be another transparent component having an equivalent strength.

Reference numeral 3 denotes conveying rollers that convey a banknote 4, which is an illuminated subject. A conveying path is defined along which the banknote 4 is conveyed in a reading direction (subscanning direction), while being sandwiched between the conveying rollers 3 and above the image sensor unit 1 beyond the cover glass 2.

Reference numeral 10 is a light source. The light source 10 includes light emitting elements 10r, 10g, 10b and 10ir that include LEDs having three colors, or red green and blue, of light emission wavelengths (hereinafter, described as RGB) and a light emission wavelength in an infrared region (hereinafter, referred to as IR). A configuration is adopted that sequentially drives the light emitting elements 10r, 10g, 10b and 10ir to emit light, thereby illuminating the banknote 4 with the light.

Here, the light emitting element 10ir has the peak light emission wavelength in a range from 800 to 1000 nm, and includes an light emitting element that has the dominant wavelength of a light emission wavelength of an infrared region. The light emitting element 10ir emits light of emission wavelengths in a region where the transmittance in an after-mentioned light guide 11 is not constant and near the region where the transmittance is not constant.

Reference numeral 11 denotes a rod-shaped light guide that guides light emitted from the light source 10 to the banknote 4. The light source 10 is disposed in proximity to the end surface of one end in the longitudinal direction of the light guide 11. The combination of the light source 10 and the light guide 11 functions as an illumination device.

The light guide 11 is made of, for instance, a transparent plastic such as an acrylic. Reference numeral 12 denotes a rod lens array as an image-forming element. The rod lens array 12 includes a plurality of erect equal magnification lens elements arranged therein.

The focal point of the rod lens array 12 on the side of the banknote 4 is arranged at a substantially center part of the conveying path.

Reference numeral $13_k$ (k is a natural number from 1 to 11) denotes a photoelectric conversion element that detects reflected light having formed an image by rod lens array 12 and converts the light into an electric signal. Reference numeral 14 denotes a sensor substrate mounted with the photoelectric conversion elements $13_k$ in a direction perpendicular to the conveying direction of the banknote 4.

In this embodiment, the number of photoelectric conversion elements $13_k$ is eleven. However, the number of photoelectric conversion elements $13_k$ is not particularly limited.

Reference numeral 15 denotes a frame as a supporting member that supports configurational components. A configuration is adopted where functional components that are the light source 10, the light guide 11, the rod lens array 12, and the sensor substrate 14 mounted with the photoelectric conversion elements $13_k$ are attached and supported in a prescribed positional relationship in the frame 15.

According to the configuration, reading operation is performed while conveying the banknote 4 in the reading direction.

More specifically, the conveying rollers 3 are rotated by a power mechanism, not shown, and thereby conveys the banknote 4 in the reading direction. Along with conveyance of the banknote 4, the image sensor unit 1 emits light by sequentially driving light emitting elements 10r, 10g, 10b and 10ir provided in the light source 10 to emit light at a reading position of the banknote 4. A surface of the banknote 4 is illuminated with the emitted light through the light guide 11 linearly and substantially uniformly in a main scanning direction. The illuminating light is reflected by the surface of the banknote 4. The reflected light is converged and forms an image by the rod lens array 12 on the photoelectric conversion elements $13_k$ provided on the sensor substrate 14. The reflected light is sequentially read and converted by the photoelectric conversion elements $13_k$ into an electric signal as one scan line of image data on the banknote 4. The electric signal is processed by a signal processor 17 including a memory circuit A as memory means, via the sensor substrate 14.

Thus, the one scan line of the entire reflected light of RGB and IR is read as the image data, thereby performing the operation of reading one scan line on the banknote 4 in the main scanning direction.

After the operation of reading one scan line, the image sensor unit 1 performs the reading operation for each scan line in an analogous manner while illuminating with light the banknote 4 conveyed by one scan line in subscanning direction along with conveyance of the banknote 4 by the conveying rollers 3.

The banknote 4 is sequentially scanned by repeating the reading operation, thereby generating RGB image data and IR image data.

After completion of scanning the entire surface of the banknote 4, the output is compared with after-mentioned authentic banknote data preliminarily stored in the signal processor 17, and validity of the banknote 4 is determined. This identifies the banknote 4. That is, authenticity is determined.

The three colors, or red, green and blue, are not necessarily used to determine authenticity of the banknote 4. For instance, two colors, or red and green may be used. An LED with a light emission wavelength such as of ultraviolet light may be employed.

The reading system is not limited to the sheet feed scanner system. The system may be a flatbed system.

A target object on which authenticity is determined is not limited to the banknote 4. Instead, the object may be a valuable security or the like.

Figure 2:
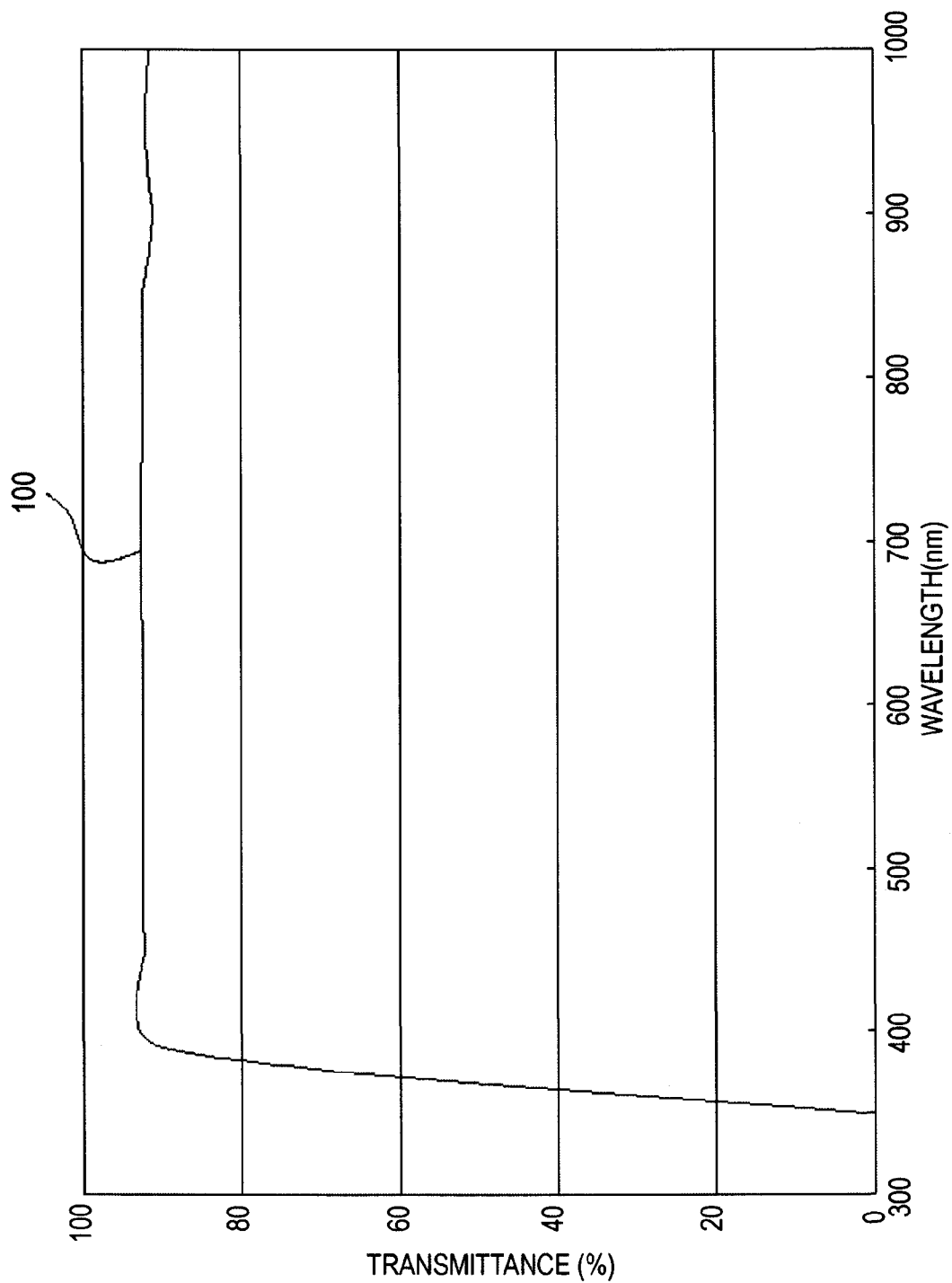
FIG. 2 is a diagram showing spectral transmittance of acrylic.

FIG. 2 is a diagram showing spectral transmittance of acrylic. FIG. 3 is a partially enlarged diagram of FIG. 2.

Reference numeral 100 is a curve representing spectral transmittance of acrylic.

Here, the spectral transmittance denotes a transmittance for each wavelength of light, which represents that, the larger the transmittance is, the less the light is absorbed in the acrylic, and, the smaller the transmittance is, the more the light is absorbed in the acrylic. The spectral transmittance of acrylic in FIGS. 2 and 3 shows data of a test specimen with thickness (d)=2 mm.

According to FIGS. 2 and 3, in the case of the acrylic, in a range from 400 to 1000 nm in a usage region of the light emission wavelength in the determination of authenticity of the banknote 4, a region in which the transmittance is not constant exists in a near infrared region from 780 to 1000 nm.

This region is specific to the material. A vibration due to the structure of the plastic causes variation in absorptivity in wavelengths in the infrared region.

For instance, methods of determining authenticity of the banknote 4 include a following method.

That is, information acquired by illuminating a printed region on the surface of the banknote 4, which is an authentic banknote, with light having prescribed light emission wavelengths (RGB and IR) is preliminarily stored as authentic banknote data in the memory circuit A of the signal processor 17. The authentic banknote data is compared with RGB image data and IR image data acquired by illuminating the printed region on the surface of the banknote 4, which is to be a determination target when the authenticity is determined, with light having the prescribed light emission wavelengths (RGB and IR), in a determination circuit B, thereby determining the authenticity of the banknote 4.

This is because a region where images acquired under RGB as visible light and under IR as infrared light are different from each other is provided by printing the banknote 4 as an authentic banknote.

Here, in a case of adopting plastic as the light guide 11, when the region where the transmittance is not constant is illuminated with light including wavelengths of an infrared region, the light of the wavelengths in the infrared region is absorbed.

Accordingly, amounts of increase or decrease of the transmittance are accumulated according to the distance of the light guide 11 in the longitudinal direction (main scanning direction). This causes substantially linear increase or decrease of the amount of light from a side end with the light source 10 to the opposite side end away from the light source 10 (the side end opposite to the side end with light source 10).

The variation owing to temperature in a region of the plastic in which the transmittance is not constant is a value of a negligible extent.

FIG. 4 is a diagram showing a temperature shift of light emission wavelengths of an LED.

Reference numeral 200 denotes a curve representing light emission wavelengths at 0° C. Reference numeral 201 denotes a curve representing light emission wavelengths at 25° C. Reference numeral 202 denotes light emission wavelengths at 50° C.

According to FIG. 4, under high temperature situations, the spectrum of the light emission wavelength tends to shift to the long wavelength side. Under low temperature situations, the spectrum of the light emission wavelengths tends to shift to the short wavelength side. From 0 to +50° C., the peak light emission wavelength varies between 870 nm to 884 nm.

This indicates that, in a case of adopting plastic as the light guide 11, the region with large variation of IR absorptivity due to the plastic shown in FIG. 3 may match with the light emission wavelength of the light emitting element 10$ir$ at a certain ambient temperature.

Thus, in the certain ambient temperature, a temperature shift is caused in the light emission wavelengths of the LED. Accordingly, the illuminance of emitted IR becomes unstable.

The typical, inexpensive LED that emits the infrared light having the peak light emission wavelength in a range between 800 and 1000 nm (i.e. LED having the dominant wavelength of a light emission wavelength in an infrared region) is adopted. However, the wavelength is not limited to this light emission wavelength, only if the wavelength is included in a near infrared region.

The material forming the light guide 11 of the present invention is not limited to plastic; the correction target is not limited to the infrared region. The present invention is applicable to a case where absorption by the light guide 11 matches with a wavelength region of emitted light at the wavelength required to read an illuminated subject.

The present invention is applicable not only to the case of light absorption due to the material, but also to a case of that due to long-term deterioration or the like. The light source 10 is not limited to the LED. The present invention is applicable not only to the case of the variation in light emission wavelength due to the temperature shift, but also to a case of that due to long-term deterioration.

Embodiment 1

Figure 5A:
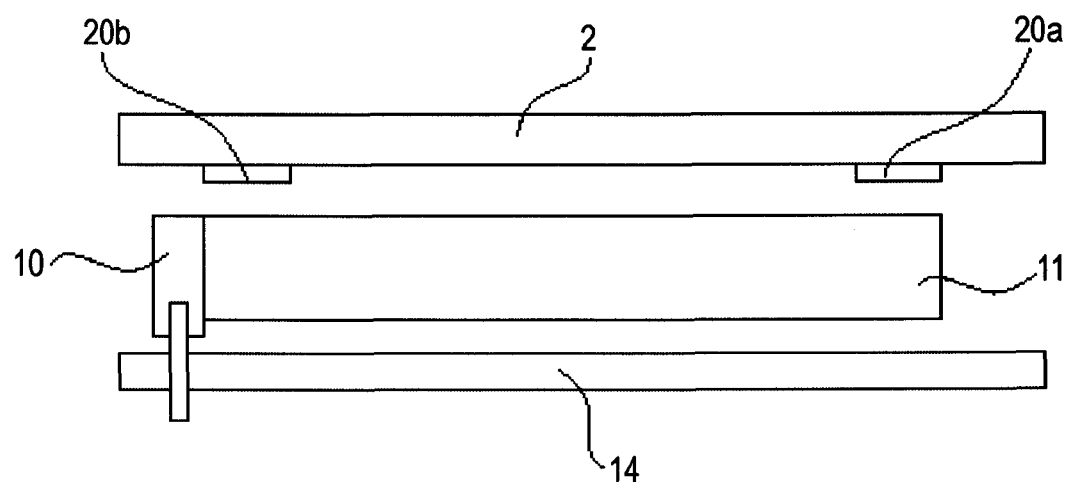
FIG. 5A is an elevational view showing a structure of an image sensor unit 1 to which the present invention is applicable.
Figure 5B:
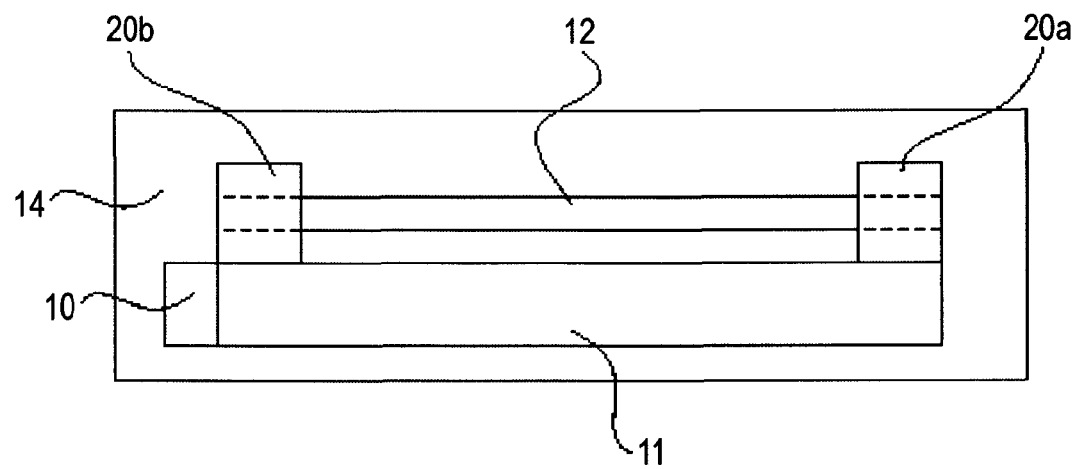
FIG. 5B is a plan view showing the structure of the image sensor unit 1 to which the present invention is applicable.

FIG. 5A is an elevational view showing a structure of an image sensor unit 1 to which the present invention is applicable. FIG. 5B is a plan view showing the structure of the image sensor unit 1 to which the present invention is applicable.

FIG. 6 is a block diagram showing a configuration of the signal processor 17. As shown in FIG. 6, the signal processor 17 is electrically connected to the image sensor unit 1.

Reference numerals 20$a$ and 20$b$ denote white reference plates as white reference means that are provided on the back of the cover glass 2 in the image sensor unit 1 and have a color of white. The white reference plates 20$a$ and 20$b$ are provided as a first white reference plate 20$a$ arranged at the opposite side end away from the light source 10 and a second white reference plate 20$b$ arranged at the side end with the light source 10, at positions that are on the opposite ends in the longitudinal direction of the rod lens array 12 and cover areas external to an image region across the banknote 4.

Here, the white reference plates 20$a$ and 20$b$ may be a plate-shaped component, or what is made by printing.

In this embodiment, areas of 100 PIX from the opposite ends in the reading region are used as external image regions (external to the reading range).

The white reference means is not limited to the white reference plates 20$a$ and 20$b$ having the color of white. Instead, the means may be a component having a certain spectral reflectance near the wavelengths of the correction target, or a correction plate having a spectral reflectance that is not constant at a specific wavelength.

For shipment of products, unevenness of the amount of light of the light source 10 and the light guide 11, unevenness of sensitivity of the photoelectric conversion elements 13$_k$ and the like are corrected on entire pixels by unit of one pixel.

This is for the sake of increasing reproducibility of gradation of the banknote 4 and prevent an error from being caused between pieces of image data.

More specifically, when the banknote 4 is read, adjustment of the amount of light that corrects the amount of light emitted from the light source 10 to the banknote 4 through the light guide 11, and gain adjustment that corrects the amplification factor for an image signal output from the photoelectric conversion element 13$_k$ are applied to each piece of image data.

Accordingly, RGB reference data for RGB image data and IR reference data for IR image data are preliminarily stored in, for instance, the memory circuit A, which is memory means, provided in the signal processor 17, as reference data that is to be a reference illuminance in the adjustment of the amount of light and the gain adjustment. Here, the RGB reference data and the IR reference data are defined with reference to respective light emission wavelengths at 25° C.

According to this configuration, RGB and IR light reflected from the first white reference plate 20$a$ and the second white reference plate 20$b$ at the opposite ends is read by the photoelectric conversion elements 13$_k$, and thereby RGB and IR white reference data that is to be white reference illuminance is generated on the basis of the reflected light.

More specifically, the RGB and IR light reflected from the first white reference plate 20$a$ and the second white reference plate 20$b$ is read by driving the light emitting elements 10$r$, 10$g$, 10$b$ and 10$ir$ provided in the light source 10 to emit light. The reflected light is converted into electric signals by the photoelectric conversion elements 13$_k$ and subsequently output to the signal processor 17. A white reference data generation circuit C as white reference data generation means that is provided in the signal processor 17 evenly corrects the signals on the basis of the average value (represented by a solid line as an auxiliary line in the diagram) and generates the RGB white reference data and the IR white reference data according to the ambient temperature on reading.

Subsequently, a correction data generation circuit D as correction data generation means, which is provided in the signal processor 17, for instance, linearly interpolates intermediate parts between the first white reference plate 20$a$ and the second white reference plate 20$b$ on the basis of the RGB white reference data and the IR white reference data. Accordingly, the RGB correction data and the IR correction data to be a white reference illuminance of the image region across the banknote 4 on reading the banknote 4 are calculated.

Further, a comparison circuit E as comparison means calculates a correction coefficient such that the RGB correction data and the IR correction data are substantially identical to the RGB reference data and the IR reference data preliminarily stored in the memory circuit A of the signal processor 17, respectively.

The RGB image data and the IR image data on reading the banknote 4 are subjected to adjustment of the amount of light and gain adjustment in a correction circuit F as correction means on the basis of respective correction coefficients, and thereby the illuminances are corrected.

The above operation is repeated until next pieces of white reference data are generated.

The white reference data may be generated at any time, such as every time when the operation of the image reader 9 is started (on switch-on), every time when the banknote is recognized, and every time of operation of reading one scan line.

The image sensor unit 1 is not limited to that using reflected light. Instead, this unit may use a transparent light source.

Figure 7:
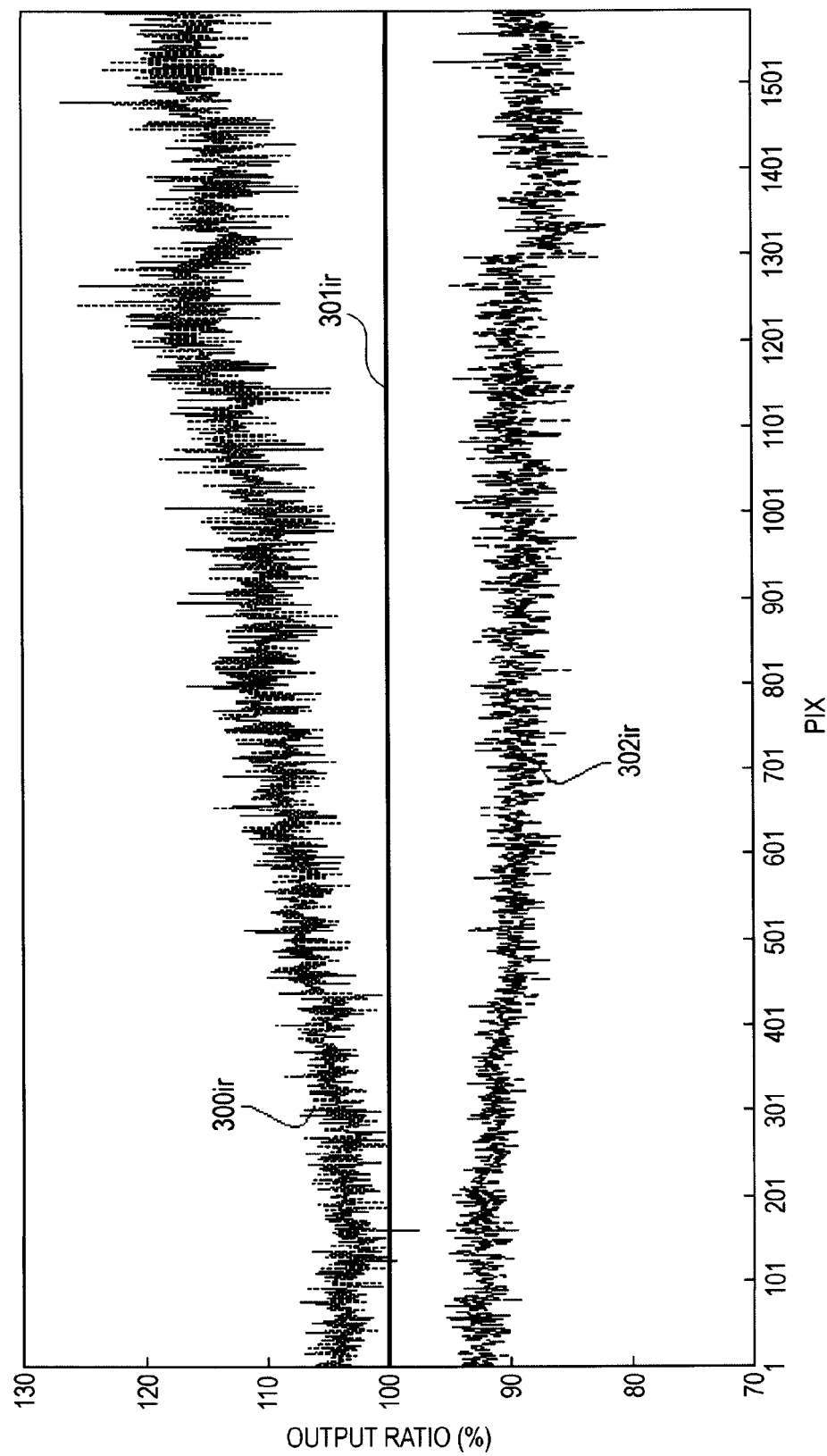
FIG. 7 is a diagram showing output ratios of illuminance where 25° C. is 100% in an IR light emission wavelength of reflected light to which the present invention is applicable.

FIG. 7 is a diagram showing output ratios of illuminance where 25° C. is 100% in an IR light emission wavelength of reflected light. Reference numerals 300$ir$, 301$ir$ and 302$ir$ denote lines of output ratios of illuminance of the reflected light having the light emission wavelengths where the ambient temperatures are 0° C., 25° C. (IR reference data) and 50° C., respectively.

The output ratios of illuminance shown in the diagram are acquired by measuring the illuminance of the reflected light on the entire surface of the reading region including the areas external to the image region in the longitudinal direction (main scanning direction) using a material equivalent to that of the white reference plates 20$a$ and 20$b$.

Figure 8:
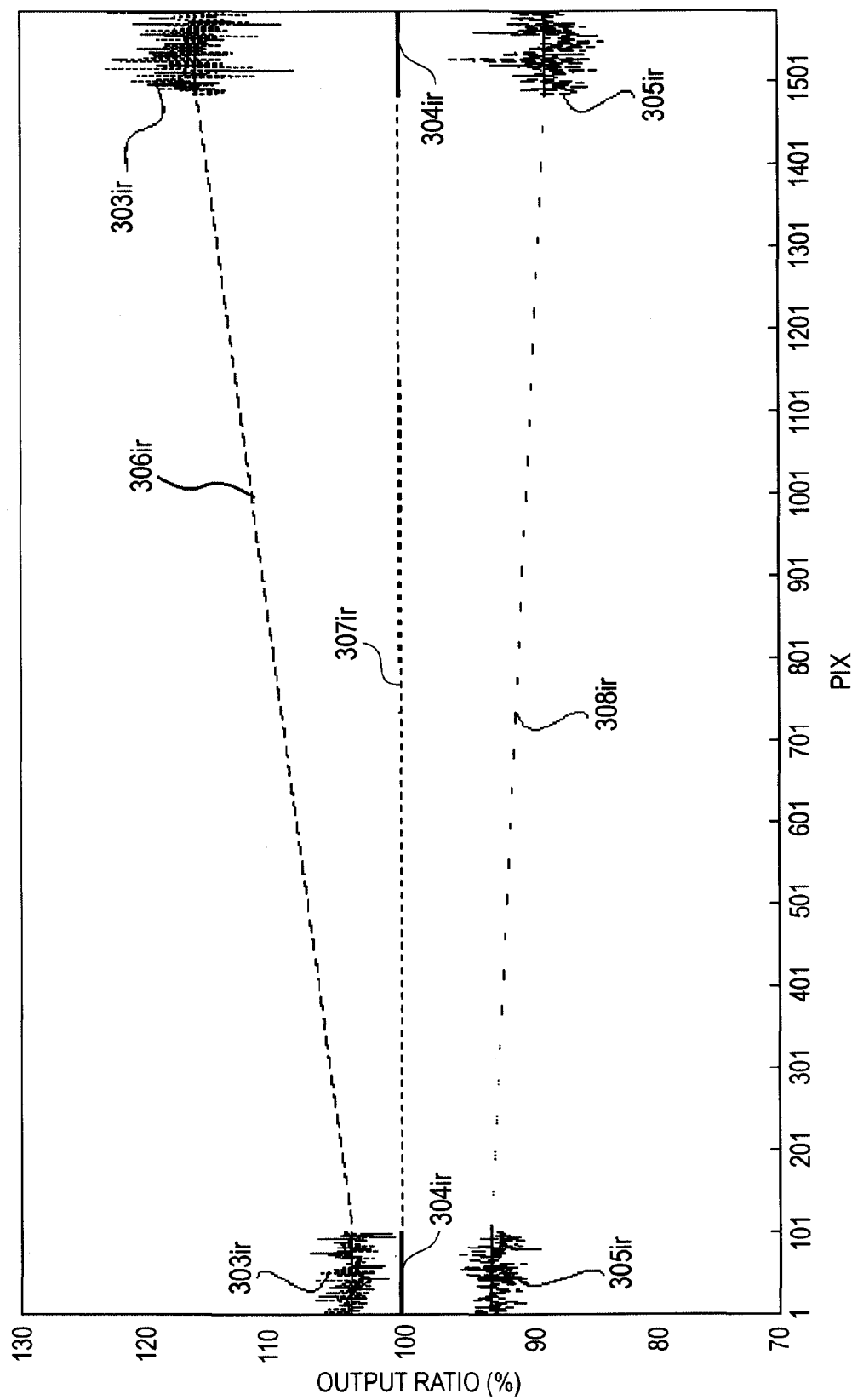
FIG. 8 is a diagram showing output ratios of illuminance where 25° C. is 100% in an IR light emission wavelength of light reflected from a first white reference plate 20a and a second white reference plate 20b.

FIG. 8 is a diagram showing output ratios of illuminance where 25° C. is 100% in an IR light emission wavelength of light reflected from the first white reference plate 20$a$ and the second white reference plate 20$b$. Reference numerals 303$ir$, 304$ir$ and 305$ir$ denote lines representing output ratios of illuminance of the IR white reference data for the light emission wavelength where the ambient temperatures are 0° C., 25° C. (IR reference data) and 50° C., respectively. Reference numerals 306$ir$, 307$ir$ and 308$ir$ denote auxiliary lines representing output ratios of IR correction data to be a white reference illuminance of the image region across the banknote 4 on reading the banknote 4 that is acquired by interpolating the intermediate parts between the first white reference plate 20$a$ and the second white reference plate 20$b$ on the basis of the IR white reference data on the lines 303$ir$, 304$ir$ and 305$ir$.

This indicates that, as to the IR image data on reading the banknote 4, the spectrum of the light emission wavelength tends to shift to the long wavelength side under high temperature situations, and the spectrum of the light emission wavelength tends to shift to the short wavelength side under low temperature situations.

Note that the lines 304$ir$ and 307$ir$ shown in FIG. 8 are identical to the line 301$ir$ shown in FIG. 7.

In this embodiment, the correction coefficient is calculated by correcting the illuminance such that the IR correction data acquired by interpolating the intermediate part between the first white reference plate 20$a$ and the second white reference plate 20$b$ on the basis of the IR white reference data is identical to the IR reference data, and used for IR image data when the banknote 4 is read, thereby allowing the illuminance to be corrected.

That is, for instance, in a case of a reading operation at the ambient temperature of 0° C., correction is made such that the auxiliary line 306$ir$ representing the IR correction data at 0° C. shown in FIG. 8 matches with the line 301$ir$ (304$ir$ and 307$ir$) representing the IR reference data, thereby correcting the IR image data. In particular, this exerts highly advantageous effect in the IR image data.

Thus, even in a case where variation in ambient temperature causes a temperature shift in the light emission wavelength in the infrared region and makes the IR illuminance unstable, the illuminance can be corrected. Accordingly, stable emission of light can be realized without varying IR image data.

This allows adopting the LED that is inexpensive in cost and emits infrared light with the peak light emission wavelengths in a range from 800 to 1000 nm as the light source 10 and adopting the plastic inexpensive in cost as the light guide 11, which facilitates reduction in cost.

Embodiment 2

FIG. 5A is the elevational view showing the structure of the image sensor unit 1 to which the present invention is applicable. FIG. 5B is the plan view showing the structure of the image sensor unit 1 to which the present invention is applicable.

Figure 9:
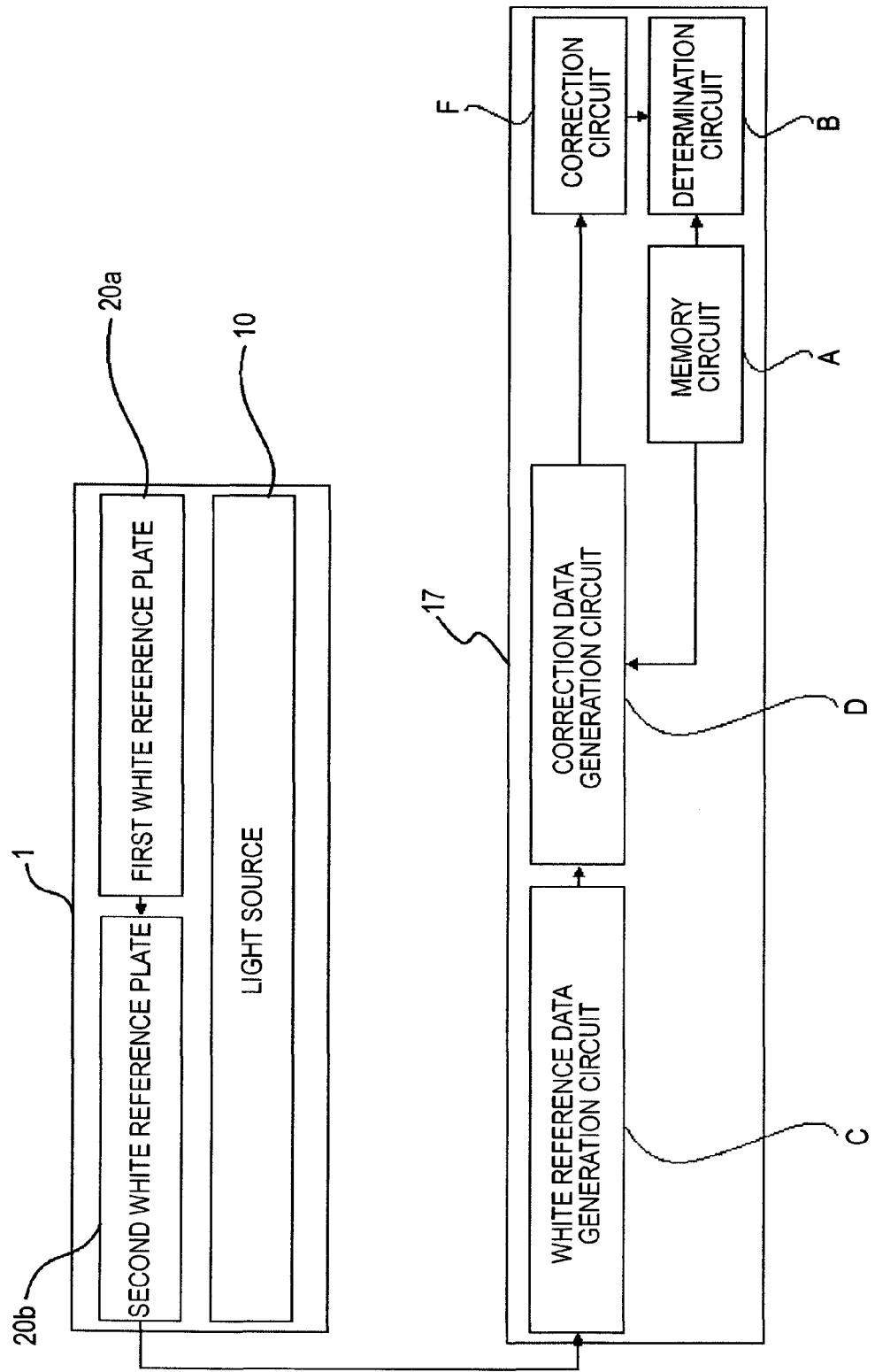
FIG. 9 is a block diagram showing another configuration of a signal processor 17.

FIG. 9 is a block diagram showing another configuration of the signal processor 17. As shown in FIG. 9, the signal processor 17 is electrically connected to the image sensor unit 1.

Reference numerals 20$a$ and 20$b$ denote white reference plates as white reference means that are provided on the back of the cover glass 2 in the image sensor unit 1 and have a color of white. The white reference plates 20$a$ and 20$b$ are provided as a first white reference plate 20$a$ arranged at the opposite side end away from the light source 10 and a second white reference plate 20$b$ arranged at the side end with the light source 10 at positions that are on the opposite ends in the longitudinal direction of the rod lens array 12 and cover respective areas external to an image region across the banknote 4.

Here, the white reference plates 20$a$ and 20$b$ may be a plate-shaped component, or what is made by means of printing.

In this embodiment, areas each of 100 PIX from the opposite ends in the reading region are used as external image regions (external to the reading range).

The white reference means is not limited to the white reference plates having the color of white. Instead, the means may be a component having a certain spectral reflectance near the wavelengths of the correction target, or a correction plate having a spectral reflectance that is not constant at a specific wavelength.

For shipment of products, unevenness of the amount of light of the light source 10 and the light guide 11, unevenness of sensitivity of the photoelectric conversion elements 13$_k$ and the like are corrected on entire pixels by unit of one pixel.

This is for the sake of increasing reproducibility of gradation of the banknote 4 and prevent an error from being caused between pieces of image data.

More specifically, when the banknote 4 is read, adjustment of the amount of light that corrects the amount of light emitted from the light source 10 to the banknote 4 through the light guide 11, and gain adjustment that corrects the amplification factor for an image signal output from the photoelectric conversion elements 13$_k$ are applied to each piece of image data.

Accordingly, RGB reference data for RGB image data and IR reference data for IR image data are preliminarily stored in, for instance, the memory circuit A, which is memory means, provided in the signal processor 17, as reference data that is to be a reference illuminance in the adjustment of the amount of light and the gain adjustment. Here, the RGB reference data and the IR reference data are relative to light emission wavelengths under temperature conditions having gradually been changed, and plural pieces of the data are stored according to the temperature conditions.

According to this configuration, RGB and IR light reflected from the first white reference plate 20a and the second white reference plate 20b at the opposite ends is read by the photoelectric conversion elements 13$_k$, and thereby RGB and IR white reference data that is to be white reference illuminance is generated on the basis of the reflected light.

More specifically, the RGB and IR light reflected from the first white reference plate 20a and the second white reference plate 20b is read by driving the light emitting elements 10r, 10g, 10b and 10ir provided in the light source 10 to emit light. The reflected light is converted into electric signals by the photoelectric conversion elements 13$_k$ and subsequently output to the signal processor 17. A white reference data generation circuit C as white reference data generation means that is provided in the signal processor 17 evenly corrects the signals on the basis of the average value (represented by a solid line as an auxiliary line in the diagram) and generates the RGB white reference data and the IR white reference data according to the ambient temperature on reading.

Subsequently, a correction data generation circuit D as correction data generation means, which is provided in the signal processor 17, selects the RGB reference data and the IR reference data that can be approximated in a substantially identical shape from among the plural pieces of the RGB reference data and the IR reference data preliminarily stored in the memory circuit A on the basis of the RGB white reference data and the IR white reference data.

The selected data is adopted as the RGB correction data and the IR correction data to be a white reference illuminance of the image region across the banknote 4 on reading the banknote 4. The preliminarily calculated correction coefficient is thus selected.

The RGB image data and the IR image data on reading the banknote 4 are subjected to adjustment of the amount of light and gain adjustment in a correction circuit F as correction means on the basis of respective correction coefficients, and thereby the illuminances are corrected.

The above operation is repeated until next pieces of white reference data are generated.

The white reference data may be generated at any time, such as every time when the operation of the image reader 9 is started (on switch-on), every time when the banknote is read, and every time of operation of reading one scan line.

The image sensor unit 1 is not limited to that using reflected light. Instead, this unit may use a transparent light source.

FIG. 7 is the diagram showing output ratios of illuminance where 25° C. is 100% in an IR light emission wavelength of reflected light. Reference numerals 300ir, 301ir and 302ir denote lines of output ratios of illuminance of the reflected light having the light emission wavelengths where the ambient temperatures are 0° C., 25° C. (IR reference data) and 50° C., respectively.

The output ratios of illuminance shown in the diagram are acquired by measuring the illuminance of the reflected light on the entire surface of the reading region including the areas external to the image region in the longitudinal direction (main scanning direction) using a material equivalent to that of the white reference plates 20a and 20b.

Figure 10:
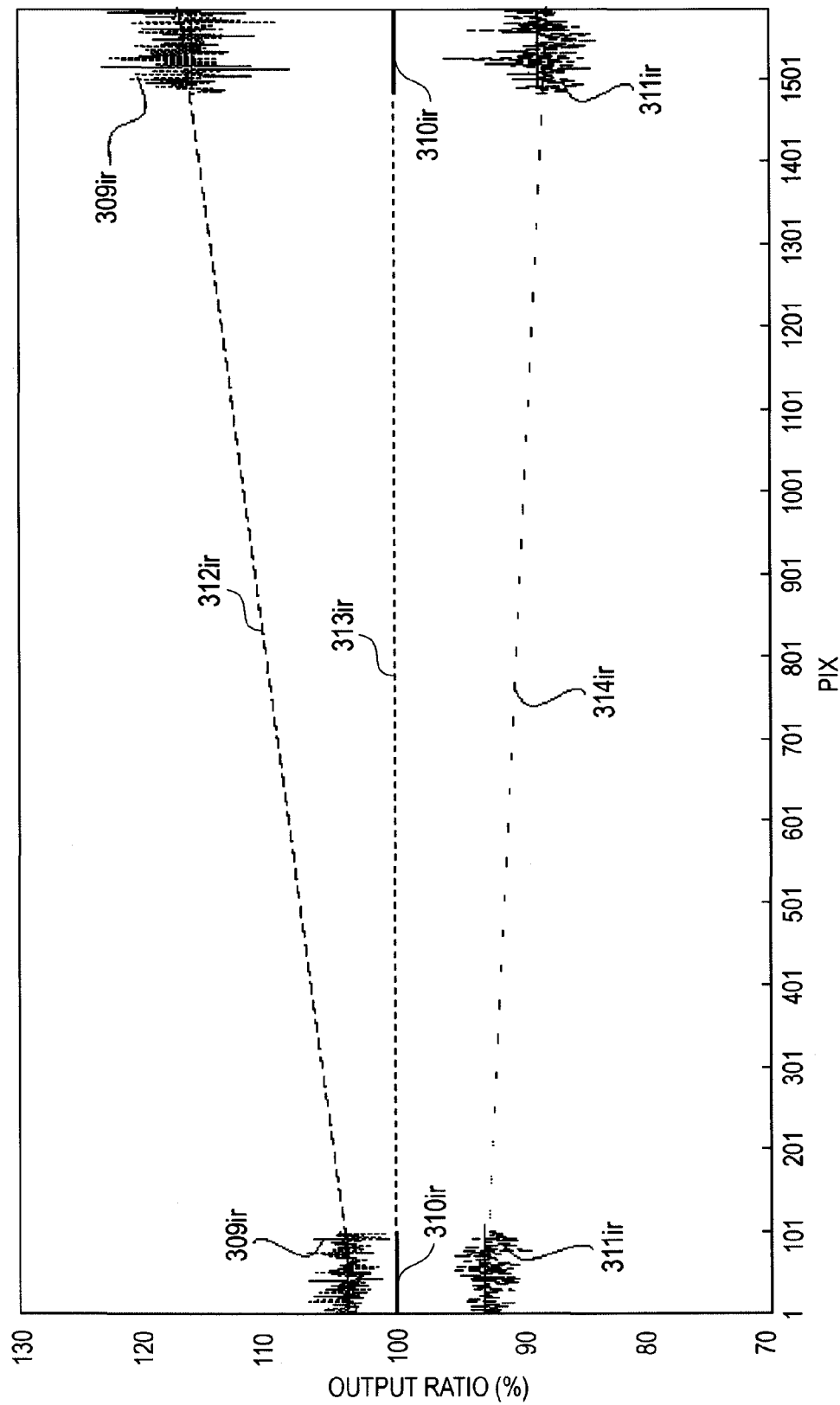
FIG. 10 is a diagram showing output ratios of illuminance where 25° C. is 100% in an IR light emission wavelength of light reflected from a first white reference plate 20a and a second white reference plate 20b and IR reference data.

FIG. 10 is a diagram showing output ratios of illuminance where 25° C. is 100% in an IR light emission wavelength of light reflected from the first white reference plate 20a and the second white reference plate 20b and the IR reference data. Reference numerals 309ir, 310ir and 311ir denote lines representing output ratios of illuminance of the IR white reference data for the light emission wavelength where the ambient temperatures are 0° C., 25° C. (IR reference data) and 50° C., respectively. Reference numerals 312ir, 313ir and 314ir denote the IR reference data preliminarily stored in the memory circuit A, and represent lines of output ratios of illuminance of the IR reference data for the light emission wavelengths where the ambient temperatures are 0° C., 25° C. (IR reference data) and 50° C., respectively.

This indicates that, as to the IR image data on reading the banknote 4, the spectrum of the light emission wavelength tends to shift to the long wavelength side under high temperature situations, and the spectrum of the light emission wavelength tends to shift to the short wavelength side under low temperature situations.

Note that the line 313ir shown in FIG. 10 is identical to the line 301ir shown in FIG. 7.

In this embodiment, the correction coefficient is selected by adopting the IR reference data capable of being approximated in the substantially identical shape as the IR correction data on the basis of the IR white reference data, and used for the IR image data on reading the banknote 4, thereby allowing the illuminance to be corrected.

That is, for instance, in a case of a reading operation at the ambient temperature of 0° C., the line 312ir representing the IR reference data capable of being approximated in the substantially identical shape is selected as the IR correction data for the line 309ir representing the IR white reference data at 0° C. shown in FIG. 10, the IR image data is corrected by a correction coefficient preliminarily calculated according to the line 312ir. In particular, this exerts highly advantageous effect in the IR image data.

Thus, even in a case where variation in ambient temperature causes a temperature shift in the light emission wavelength in the infrared region and makes the IR illuminance unstable, the illuminance can be corrected. Accordingly, stable emission of light can be realized without varying IR image data.

This allows adopting the LED that is inexpensive in cost and emits infrared light with the peak light emission wavelengths in a range from 800 to 1000 nm as the light source 10 and adopting the plastic inexpensive in cost as the light guide 11, which further facilitates reduction in cost.

Embodiment 3

Figure 11A:
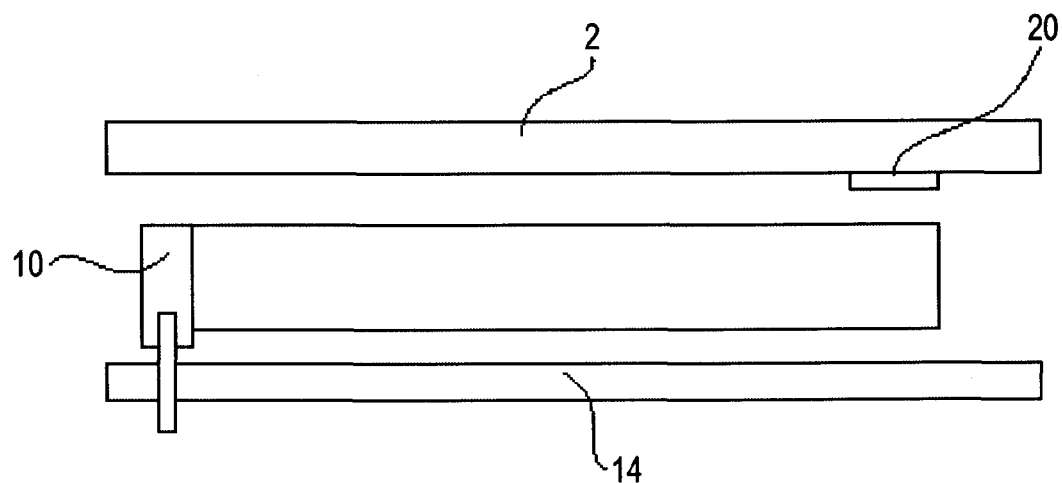
FIG. 11A is another elevational view showing a structure of an image sensor unit 1 to which the present invention is applicable.
Figure 11B:
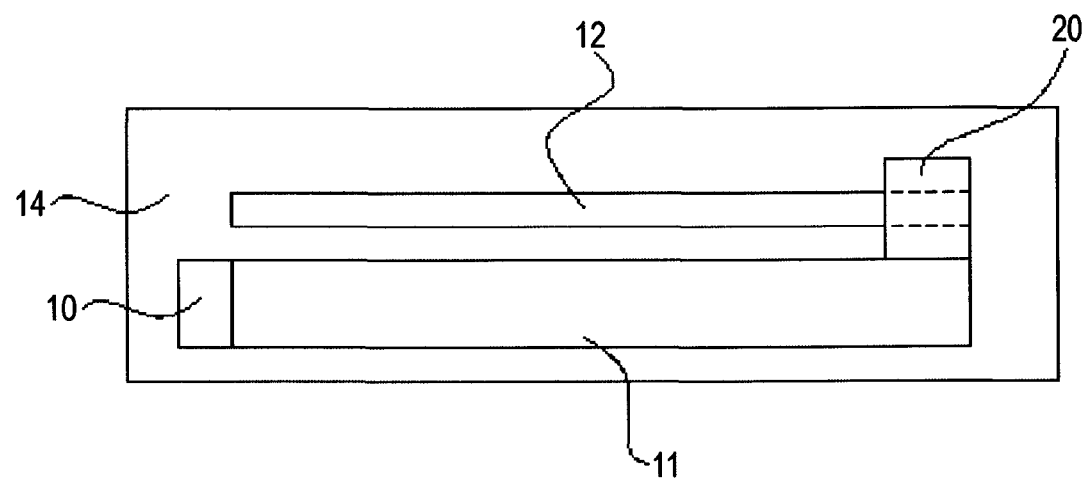
FIG. 11B is another plan view showing the structure of the image sensor unit 1 to which the present invention is applicable.

FIG. 11A is an elevational view showing another structure of an image sensor unit 1 to which the present invention is applicable. FIG. 11B is a plan view showing another structure of the image sensor unit 1 to which the present invention is applicable.

FIG. 12 is a block diagram showing another configuration of the signal processor 17. As shown in FIG. 12, the signal processor 17 is electrically connected to the image sensor unit 1.

Reference numeral 20 denotes a white reference plate as white reference means that is provided on the back of the cover glass 2 in the image sensor unit 1 and has a color of white. The white reference plate 20 is provided at a position that is the opposite side end away from the light source 10 in the longitudinal direction of the rod lens array 12 and covers an area external to an image region across the banknote 4.

Here, the white reference plate 20 may be a plate-shaped component, or what is made by printing.

In this embodiment, an area of 100 PIX from the opposite side end away from the light source 10 in the reading region is used as an external image region (external to the reading range).

The white reference means is not limited to the white reference plate having the color of white. Instead, the means may be a component having a certain spectral reflectance near the wavelengths of the correction target, or a correction plate having a spectral reflectance that is not constant at a specific wavelength.

For shipment of products, unevenness of the amount of light of the light source 10 and the light guide 11, unevenness of sensitivity of the photoelectric conversion elements $13_k$ and the like are corrected on entire pixels by unit of one pixel.

This is for the sake of increasing reproducibility of gradation of the banknote 4 and prevent an error from being caused between pieces of image data.

More specifically, when the banknote 4 is read, adjustment of the amount of light that corrects the amount of light emitted from the light source 10 to the banknote 4 through the light guide 11, and gain adjustment that corrects the amplification factor for an image signal output from the photoelectric conversion element $13_k$ are applied to each piece of image data.

Accordingly, RGB reference data for RGB image data and IR reference data for IR image data are preliminarily stored in, for instance, the memory circuit A, which is memory means, provided in the signal processor 17, as reference data that is to be a reference illuminance in the adjustment of the amount of light and the gain adjustment. Here, the RGB reference data and the IR reference data are defined with reference to respective light emission wavelengths at 25° C.

According to this configuration, RGB and IR light reflected from the white reference plate 20 is read by the photoelectric conversion elements $13_k$, and thereby RGB and IR white reference data that is to be white reference illuminance is generated on the basis of the reflected light.

More specifically, the RGB and IR light reflected from the white reference plate 20 is read by driving the light emitting elements 10r, 10g, 10b and 10ir provided in the light source 10 to emit light. The reflected light is converted into electric signals by the photoelectric conversion elements $13_k$ and subsequently output to the signal processor 17. A white reference data generation circuit C as white reference data generation means that is provided in the signal processor 17 evenly corrects the signals on the basis of the average value (represented by a solid line as an auxiliary line in the diagram) and generates the RGB white reference data and the IR white reference data according to the ambient temperature on reading.

Subsequently, a correction data generation circuit D as correction data generation means, which is provided in the signal processor 17, for instance, linearly interpolates the RGB reference data and the IR reference data between the white reference plate 20 and the side end with the light source 10 in the image region that is across the banknote 4 on the basis of the RGB white reference data and the IR white reference data. Accordingly, the RGB correction data and the IR correction data to be a white reference illuminance of the image region across the banknote 4 on reading the banknote 4 are calculated.

Further, a comparison circuit E as comparison means calculates a correction coefficient such that the RGB correction data and the IR correction data are substantially identical to the RGB reference data and the IR reference data preliminarily stored in the memory circuit A of the signal processor 17, respectively.

The RGB image data and the IR image data on reading the banknote 4 are subjected to adjustment of the amount of light and gain adjustment in a correction circuit F as correction means on the basis of respective correction coefficients, and thereby the illuminances are corrected.

The above operation is repeated until next pieces of white reference data are generated.

The white reference data may be generated at any time, such as every time when the operation of the image reader 9 is started (on switch-on), every time when the banknote is read, and every time of operation of reading one scan line.

The image sensor unit 1 is not limited to that using reflected light. Instead, this unit may use a transparent light source.

FIG. 7 is the diagram showing output ratios of illuminance where 25° C. is 100% in an IR light emission wavelength of reflected light. Reference numerals 300ir, 301ir and 302ir denote lines of output ratios of illuminance of the reflected light having the light emission wavelengths where the ambient temperatures are 0° C., 25° C. (IR reference data) and 50° C., respectively.

The output ratios of illuminance shown in the diagram are acquired by measuring the illuminance of the reflected light on the entire surface of the reading region including the area external to the image region in the longitudinal direction (main scanning direction) using a material equivalent to that of the white reference plate 20.

Figure 13:
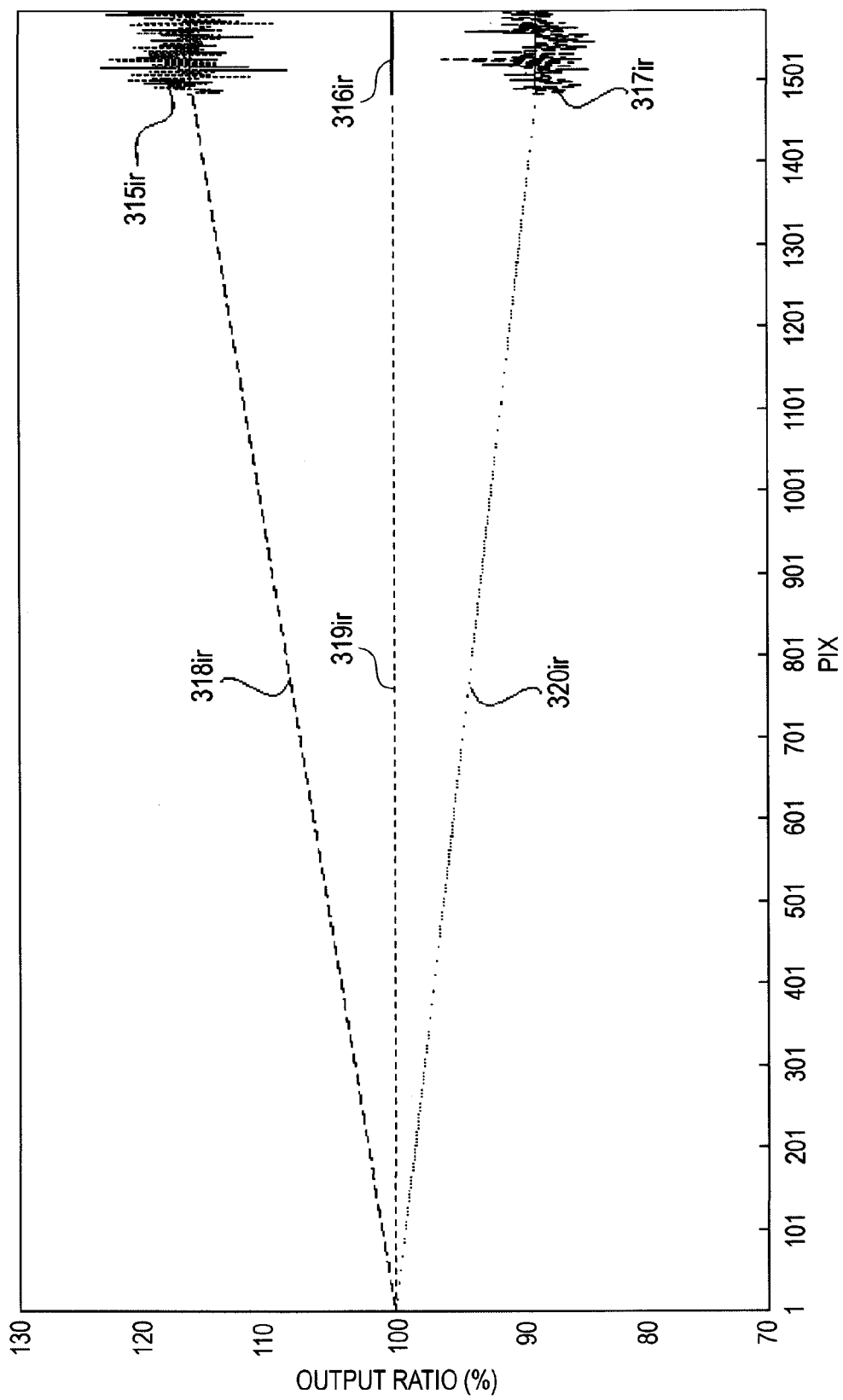
FIG. 13 is a diagram showing output ratios of illuminance where 25° C. is 100% in an IR light emission wavelength of light reflected from a white reference plate 20.

FIG. 13 is a diagram showing output ratios of illuminance where 25° C. is 100% in an IR light emission wavelength of light reflected from the white reference plate 20. Reference numerals 315ir, 316ir and 317ir denote lines representing output ratios of illuminance of the IR white reference data for the light emission wavelength where the ambient temperatures are 0° C., 25° C. (IR reference data) and 50° C., respectively. Reference numerals 318ir, 319ir and 320ir denote auxiliary lines representing output ratios of IR correction data to be a white reference illuminance of the image region across the banknote 4 on reading the banknote 4 that is acquired by interpolating data for the white reference plate 20 and the IR reference data for the side end with the light source 10 on the basis of the IR white reference data on the lines 315ir, 316ir and 317ir.

This indicates that, as to the IR image data on reading the banknote 4, the spectrum of the light emission wavelength tends to shift to the long wavelength side under high temperature situations, and the spectrum of the light emission wavelength tends to shift to the short wavelength side under low temperature situations.

Note that the lines 316ir and 319ir shown in FIG. 13 are identical to the line 301ir shown in FIG. 7.

In this embodiment, the correction coefficient is calculated by correcting the illuminance such that the IR correction data acquired by interpolating the IR reference data between the white reference plate 20 and the side end with the light source 10 is identical to the IR reference data on the basis of the IR white reference data, and used for IR image data when the banknote 4 is read, thereby allowing the illuminance to be corrected.

That is, for instance, in a case of a reading operation at the ambient temperature of 0° C., correction is made such that the auxiliary line 318ir representing the IR correction data at 0° C. shown in FIG. 13 matches with the line 301ir (304ir and 307ir) representing the IR reference data, thereby correcting the IR image data. In particular, this exerts highly advantageous effect in the IR image data.

As to absorptivity of the IR light emission wavelength in the plastic, the amount of light is substantially linearly increased or decreased from the side end surface with the light source 10 to the opposite side end surface away from the light source 10 because the amount of increase or decrease of the IR transmittance is accumulated according to the direction in the longitudinal direction (main scanning direction) of the light guide 11. Accordingly, variation in illuminance of the side end with the light source 10 is in a negligible extent. The variation in illuminance can be corrected only with the correction data at the opposite side end away from the light source 10.

Thus, even in a case where variation in ambient temperature causes a temperature shift in the light emission wavelength in the infrared region and makes the IR illuminance unstable, the illuminance can be corrected. Accordingly, stable emission of light can be realized without varying IR image data.

This allows adopting the LED that is inexpensive in cost and emits infrared light with the peak light emission wavelengths in a range from 800 to 1000 nm as the light source 10 and adopting the plastic inexpensive in cost as the light guide 11, which facilitates reduction in cost without greatly increasing the numbers of components and man-hours.

Embodiment 4

FIG. 11A is an elevational view showing another structure of an image sensor unit 1 to which the present invention is applicable. FIG. 11B is a plan view showing another structure of the image sensor unit 1 to which the present invention is applicable.

Figure 14:
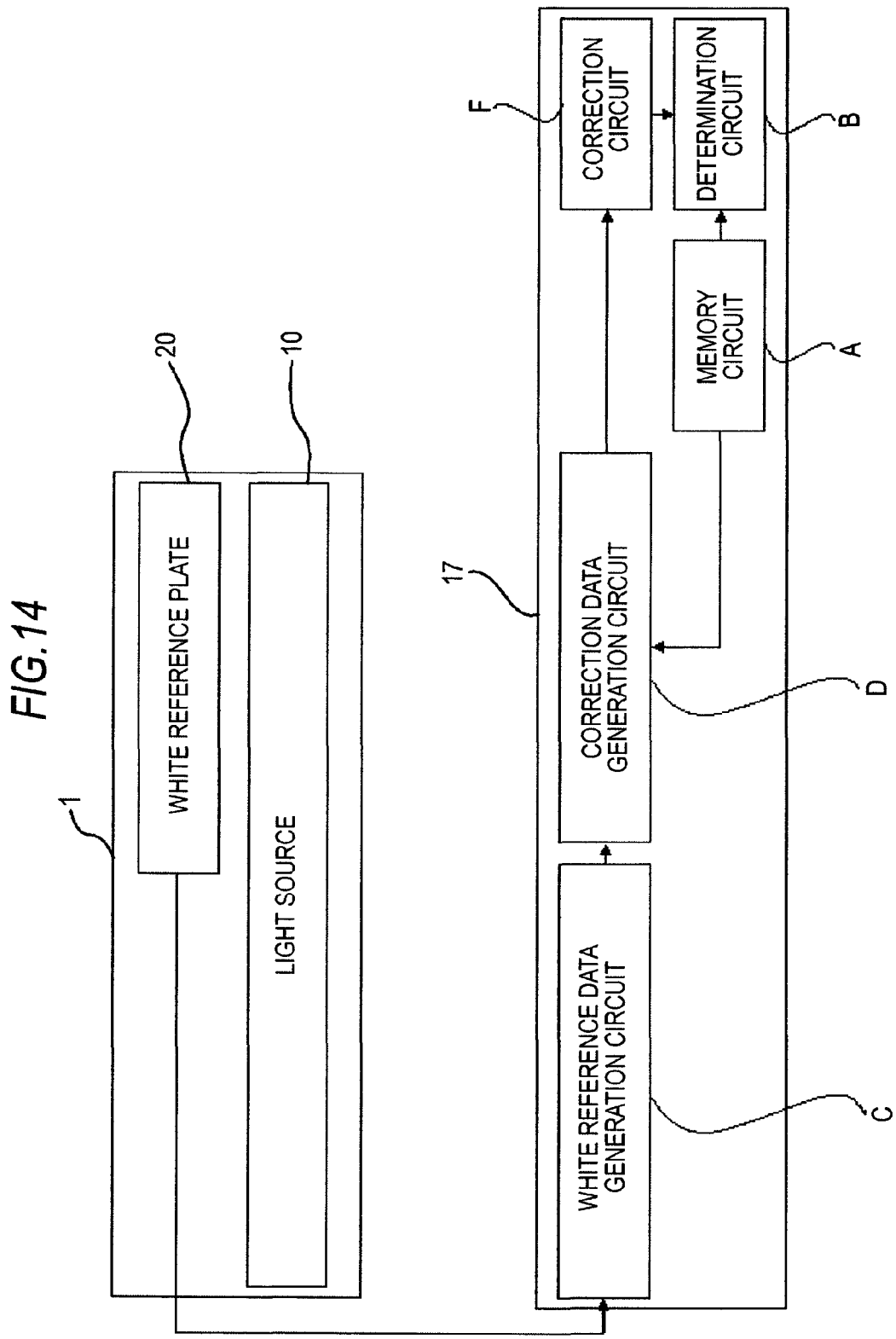
FIG. 14 a block diagram showing another configuration of a signal processor 17.

FIG. 14 is a block diagram showing another configuration of the signal processor 17. As shown in FIG. 14, the signal processor 17 is electrically connected to the image sensor unit 1.

Reference numeral 20 denotes a white reference plate as white reference means that is provided on the back of the cover glass 2 in the image sensor unit 1 and has a color of white. The white reference plate 20 is provided at a position that is the opposite side end away from the light source 10 in the longitudinal direction of the rod lens array 12 and covers an area external to an image region across the banknote 4.

Here, the white reference plate 20 may be a plate-shaped component, or what is made by printing.

In this embodiment, an area of 100 PIX from the opposite side end away from the light source 10 in the reading region is used as an external image region (external to the reading range).

The white reference means is not limited to the white reference plate having the color of white. Instead, the means may be a component having a certain spectral reflectance near the wavelengths of the correction target, or a correction plate having a spectral reflectance that is not constant at a specific wavelength.

For shipment of products, unevenness of the amount of light of the light source 10 and the light guide 11, unevenness of sensitivity of the photoelectric conversion elements $13_k$ and the like are corrected on entire pixels by unit of one pixel.

This is for the sake of increasing reproducibility of gradation of the banknote 4 and prevent an error from being caused between pieces of image data.

More specifically, when the banknote 4 is read, adjustment of the amount of light that corrects the amount of light emitted from the light source 10 to the banknote 4 through the light guide 11, and gain adjustment that corrects the amplification factor for an image signal output from the photoelectric conversion element $13_k$ are applied to each piece of image data.

Accordingly, RGB reference data for RGB image data and IR reference data for IR image data are preliminarily stored in, for instance, the memory circuit A, which is memory means, provided in the signal processor 17, as reference data that is to be a reference illuminance in the adjustment of the amount of light and the gain adjustment. Here, the RGB reference data and the IR reference data are defined with reference to light emission wavelengths under temperature conditions having gradually been changed, and plural pieces of the data are stored according to the temperature conditions.

According to this configuration, RGB and IR light reflected from the white reference plate 20 is read by the photoelectric conversion elements $13_k$, and thereby RGB and IR white reference data that is to be white reference illuminance is generated on the basis of the reflected light.

More specifically, the RGB and IR light reflected from the white reference plate 20 is read by driving the light emitting elements 10r, 10g, 10b and 10ir provided in the light source 10 to emit light. The reflected light is converted into electric signals by the photoelectric conversion elements $13_k$ and subsequently output to the signal processor 17. A white reference data generation circuit C as white reference data generation means that is provided in the signal processor 17 evenly corrects the signals on the basis of the average value (represented by a solid line as an auxiliary line in the diagram) and generates evenly corrected RGB white reference data and IR white reference data according to the ambient temperature on reading.

Subsequently, a correction data generation circuit D as correction data generation means, which is provided in the signal processor 17, selects the RGB reference data and the IR reference data that can be approximated in a substantially identical shape from among the plural pieces of the RGB reference data and the IR reference data preliminarily stored in the memory circuit A on the basis of the RGB white reference data and the IR white reference data.

The selected data is adopted as the RGB correction data and the IR correction data to be a white reference illuminance of the image region across the banknote 4 on reading the banknote 4. The preliminarily calculated correction coefficient is thus selected.

The RGB image data and the IR image data on reading the banknote 4 are subjected to adjustment of the amount of light and gain adjustment in a correction circuit F as correction means on the basis of respective correction coefficients, and thereby the illuminances are corrected.

The above operation is repeated until next pieces of white reference data are generated.

The white reference data may be generated at any time, such as every time when the operation of the image reader 9 is started (on switch-on), every time when the banknote is read, and every time of operation of reading one scan line.

The image sensor unit 1 is not limited to that using reflected light. Instead, this unit may use a transparent light source.

FIG. 7 is the diagram showing output ratios of illuminance where 25° C. is 100% in an IR light emission wavelength of reflected light. Reference numerals 300ir, 301ir and 302ir denote lines of output ratios of illuminance of the reflected light having the light emission wavelengths where the ambient temperatures are 0° C., 25° C. (IR reference data) and 50° C., respectively.

The output ratios of illuminance shown in the diagram are acquired by measuring the illuminance of the reflected light on the entire surface of the reading region including the area external to the image region in the longitudinal direction (main scanning direction) using a material equivalent to that of the white reference plate 20.

Figure 15:
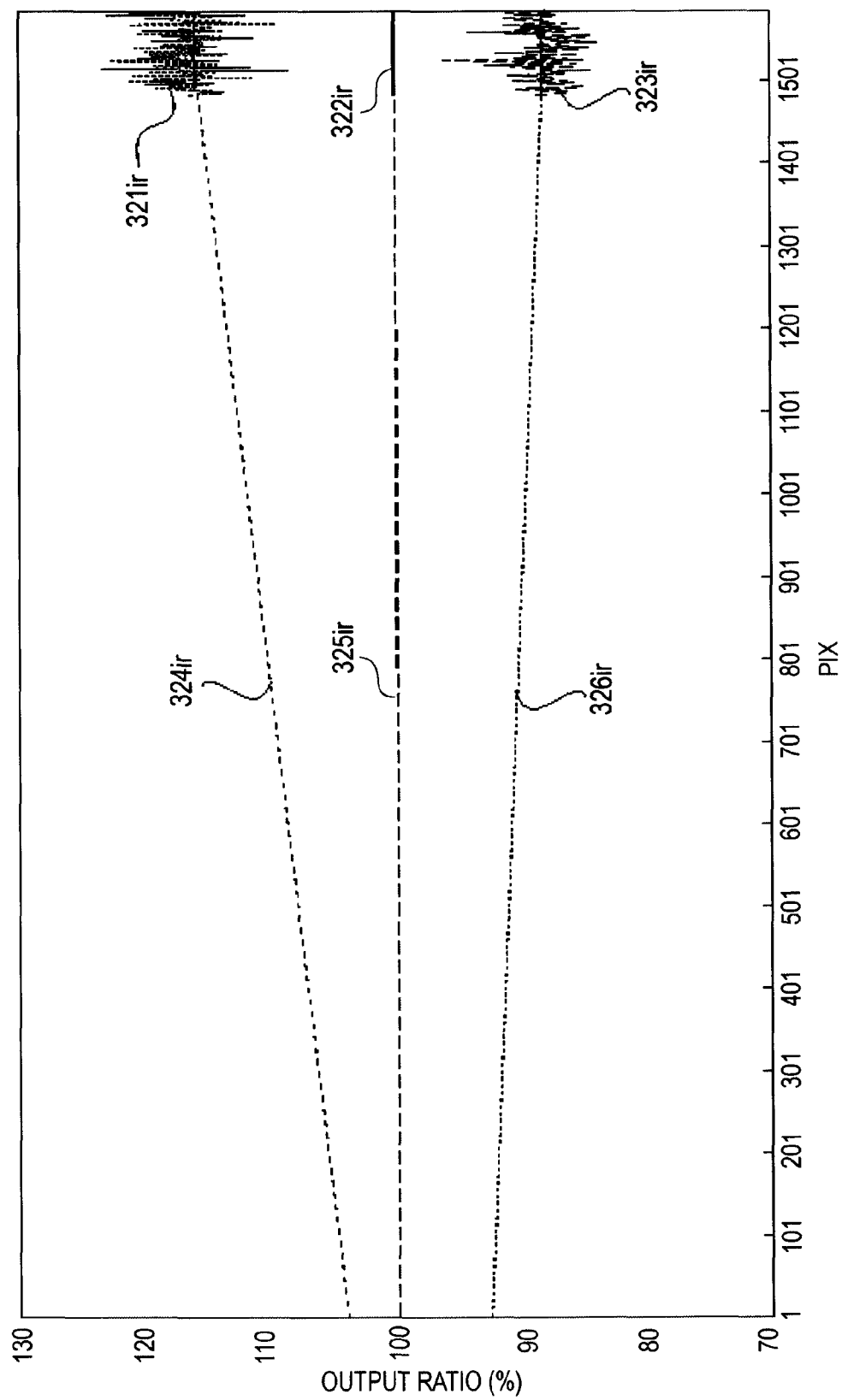
FIG. 15 is another diagram showing output ratios of illuminance where 25° C. is 100% in an IR light emission wavelength of light reflected from a white reference plate 20.

FIG. 15 is a diagram showing output ratios of illuminance where 25° C. is 100% in an IR light emission wavelength of light reflected from the white reference plate 20 and the IR reference data. Reference numerals 321ir, 322ir and 323ir denote lines representing output ratios of illuminance of the IR white reference data for the light emission wavelength where the ambient temperatures are 0° C., 25° C. (IR reference data) and 50° C., respectively. Reference numerals 324*ir*, 325*ir* and 326*ir* denote the IR reference data preliminarily stored in the memory circuit A, and represent lines of the output ratios of illuminances for the light emission wavelengths where the ambient temperatures are 0° C., 25° C. (IR reference data) and 50° C.

This indicates that, as to the IR image data on reading the banknote 4, the spectrum of the light emission wavelength tends to shift to the long wavelength side under high temperature situations, and the spectrum of the light emission wavelength tends to shift to the short wavelength side under low temperature situations.

Note that the line 325*ir* shown in FIG. 15 is identical to the line 301*ir* shown in FIG. 7.

In this embodiment, the correction coefficient is selected by adopting the IR reference data capable of being approximated in the substantially identical shape as the IR correction data on the basis of the IR white reference data, and used for the IR image data on reading the banknote 4, thereby allowing the illuminance to be corrected.

That is, for instance, in a case of a reading operation at the ambient temperature of 0° C., the line 324*ir* representing the IR reference data capable of being approximated in the substantially identical shape is selected as the IR correction data for the line 321*ir* representing the IR white reference data at 0° C. shown in FIG. 15, thereby correcting the IR image data by means of the correction coefficient having preliminarily been calculated (according to the line 324*ir*). In particular, this exerts highly advantageous effect in the IR image data.

Thus, even in a case where variation in ambient temperature causes a temperature shift in the light emission wavelength in the infrared region and makes the IR illuminance unstable, the illuminance can be corrected. Accordingly, stable emission of light can be realized without varying IR image data.

This allows adopting the LED that is inexpensive in cost and emits infrared light with the peak light emission wavelengths in a range from 800 to 1000 nm as the light source 10 and adopting the plastic inexpensive in cost as the light guide 11, which facilitates reduction in cost without greatly increasing the numbers of components and man-hours.

The authenticity determination of the banknote by means of correcting the image data in a paper sheet identification apparatus has been described as one example of the image reader. However, in a case of using the apparatus as an image reader, it is suffice to only correct image data.

As described above, in the case of reading the illuminated subject, white reference means is provided at positions that are at opposite ends of the image-forming element and cover areas external to the image region across an illuminated subject. The correction coefficient calculated from the correction data and the reference data preliminarily stored in the memory circuit of the signal processor is used for correcting the image data on reading the illuminated subject on the basis of white reference data generated from light from the white reference means. Accordingly, even in a case where a temperature shift is caused in the light emission wavelength of the LED, the illuminance can be corrected. This allows stable image data to be acquired without occurrence of variation in image data.

In the case of reading the illuminated subject, white reference means is provided at positions that are at opposite ends of the image-forming element and cover areas external to the image region across the illuminated subject. The correction coefficient calculated by adopting the reference data capable of being approximated in a substantially identical shape from among plural pieces of reference data preliminarily stored in the memory circuit of the signal processor is used for correcting the image data on reading the illuminated subject on the basis of white reference data generated from light from the white reference means. Accordingly, even in a case where a temperature shift is caused in the light emission wavelength of the LED, the illuminance can be corrected. This allows stable image data to be acquired without occurrence of variation in image data.

In the case of reading the illuminated subject, white reference means is provided at a position that is at the opposite side end of the image-forming element away from the light source and covers an area external to the image region across the illuminated subject. The correction coefficient calculated by correcting the illuminance such that the correction data and the reference data preliminarily stored in the memory circuit of the signal processor on the basis of the white reference data representing the white reference illuminance generated from light from the white reference means is used for correcting the image data on reading the illuminated object. Accordingly, even in a case where a temperature shift is caused in the light emission wavelength of the LED, the illuminance can be corrected without greatly increasing the numbers of components and man-hours. This allows stable image data to be acquired without occurrence of variation in image data.

In the case of reading the illuminated subject, white reference means is provided at a position that is at the opposite side end of the image-forming element away from the light source and covers an area external to the image region across the illuminated subject. The correction coefficient calculated by adopting the reference data capable of being approximated in a substantially identical shape from among plural pieces of reference data preliminarily stored in the memory circuit of the signal processor on the basis of the white reference data representing the white reference illuminance generated from light from the white reference means is used for correcting the image data on reading the illuminated object. Accordingly, even in a case where a temperature shift is caused in the light emission wavelength of the LED, the illuminance can be corrected without greatly increasing the numbers of components and man-hours. This allows stable image data to be acquired without occurrence of variation in image data.

Although the embodiments (examples) of the present invention have been described above in detail, the embodiments (examples) are illustrated only as specific examples for implementing the present invention. The technical scope of the present invention is not limited to the embodiments (examples). In the present invention, various modifications can be made thereto within the scope without departing from the spirit of the present invention.

The image sensor unit of the present invention is a technique effective as image readers, such as an image scanner, a facsimile and a paper sheet identification apparatus.

What is claimed is:

1. An image sensor unit, comprising:
    a light source;
    a light guide that guides light from the light source and linearly emits light to a subject to be illuminated;
    an image-forming element that forms an image of light from the illuminated subject on a photoelectric conversion element to generate image data;
    a memory circuit that stores reference data to be a reference illuminance of an image region across the illuminated subject;
    a white reference provided at positions that are at opposite ends of the image-forming element in a longitudinal direction and cover respective areas external to the image region across the illuminated subject;

a white reference data generation circuit that reads light reflected from the white reference means by the photoelectric conversion element and for generating white reference data that represents a white reference illuminance;

a correction data generation circuit that generates correction data that represents a white reference illuminance of the image region across the illuminated subject on the basis of the white reference data;

a comparison circuit that calculates a correction coefficient from the correction data and the reference data; and a correction circuit that corrects the image data on the basis of the correction coefficient, wherein the light guide is made of a material having a region in which transmittance is not constant with respect to wavelength, and wherein the light source includes at least one of light emission wavelengths in the region of the light guide in which transmittance is not constant and light emission wavelengths in proximity to the region in which transmittance is not constant.

2. The image sensor unit according to claim 1, wherein the light source includes a light emitting element whose dominant wavelength is a light emission wavelength in an infrared region.

3. An image sensor unit, comprising:

a light source;

a light guide that guides light from the light source and linearly emits light to a subject to be illuminated;

an image-forming element that forms an image of light from the illuminated subject on a photoelectric conversion element;

a memory circuit that stores plural pieces of reference data to be a reference illuminance of an image region across the illuminated subject according to respective temperature conditions;

a white reference provided at positions that are at opposite ends of the image-forming element in a longitudinal direction and cover respective areas external to the image region across the illuminated subject;

a white reference data generation circuit that reads light reflected from the white reference means by the photoelectric conversion element and for generating white reference data that represents a white reference illuminance;

a correction data generation circuit that calculates a correction coefficient for the image region across the illuminated subject by adopting reference data capable of being approximated to the plural pieces of reference data as correction data that represents a white reference illuminance on the basis of the white reference data; and a correction circuit that corrects the image data on the basis of the correction coefficient, wherein the light guide is made of a material having a region in which transmittance is not constant with respect to wavelength, and wherein the light source includes at least one of light emission wavelengths in the region of the light guide in which transmittance is not constant and light emission wavelengths in proximity to the region in which transmittance is not constant.

4. The image sensor unit according to claim 3, wherein the light source includes a light emitting element whose dominant wavelength is a light emission wavelength in an infrared region.

5. An image sensor unit, comprising:

a light source;

a light guide that guides light from the light source and linearly emits light to a subject to be illuminated;

an image-forming element that forms an image of light from the illuminated subject on a photoelectric conversion element;

a memory circuit that stores reference data to be a reference illuminance of an image region across the illuminated subject;

a white reference provided at a position that is at an opposite side end of the image-forming element in a longitudinal direction away from the light source and covers an area external to the image region across the illuminated subject;

a white reference data generation circuit that reads light reflected from the white reference means by the photoelectric conversion element and for generating white reference data that represents a white reference illuminance;

a correction data generation circuit that generates correction data that represents a white reference illuminance of the image region across the illuminated subject on the basis of the white reference data;

a comparison circuit that calculates a correction coefficient from the correction data and the reference data; and a correction circuit that corrects the image data on the basis of the correction coefficient, wherein the light guide is made of a material having a region in which transmittance is not constant with respect to wavelength, and wherein the light source includes at least one of light emission wavelengths in the region of the light guide in which transmittance is not constant and light emission wavelengths in proximity to the region in which transmittance is not constant.

6. The image sensor unit according to claim 5, wherein the light source includes a light emitting element whose dominant wavelength is a light emission wavelength in an infrared region.

7. An image sensor unit, comprising:

a light source;

a light guide that guides light from the light source and linearly emits light to a subject to be illuminated;

an image-forming element that forms an image of light from the illuminated subject on a photoelectric conversion element;

a memory circuit that stores plural pieces of reference data to be a reference illuminance of an image region across the illuminated subject according to respective temperature conditions;

a white reference provided at a position that is at an opposite side end of the image-forming element in a longitudinal direction away from the light source and covers an area external to the image region across the illuminated subject;

a white reference data generation circuit that reads means for reading light reflected from the white reference means by the photoelectric conversion element and for generating white reference data that represents a white reference illuminance;

a correction data generation circuit that calculates a correction coefficient for the image region across the illuminated subject by adopting reference data capable of being approximated to the plural pieces of reference data as correction data that represents a white reference illuminance on the basis of the white reference data; and a correction circuit that corrects the image data on the basis of the correction coefficient, wherein the light guide is made of a material having a region in which transmittance is not constant with respect to wavelength, and wherein the light source includes at least one of light emission wavelengths in the region of the light guide in which transmittance is not constant and light emission wavelengths in proximity to the region in which transmittance is not constant.

8. The image sensor unit according to claim 7, wherein the light source includes a light emitting element whose dominant wavelength is a light emission wavelength in an infrared region.

9. An image reader comprising:

an image sensor unit including a light source, a light guide that guides light from the light source and linearly emits light to a subject to be illuminated, an image-forming element that forms an image of light from the illuminated subject on a photoelectric conversion element, a memory circuit that stores reference data to be a reference illuminance of an image region across the illuminated subject, a white reference circuit provided at positions that are at opposite ends of the image-forming element in a longitudinal direction and cover respective areas external to the image region across the illuminated subject, a white reference data generation circuit that reads light reflected from the white reference means by the photoelectric conversion element and for generating white reference data that represents a white reference illuminance, a correction data generation circuit that generates correction data that represents a white reference illuminance of the image region across the illuminated subject on the basis of the white reference data, a comparison circuit that calculates a correction coefficient from the correction data and the reference data, and a correction circuit that corrects the image data on the basis of the correction coefficient; and a conveying path configured to convey the subject to be illuminated past the image sensor unit, wherein the light guide is made of a material having a region in which transmittance is not constant with respect to wavelength, and wherein the light source includes at least one of light emission wavelengths in the region of the light guide in which transmittance is not constant and light emission wavelengths in proximity to the region in which transmittance is not constant.

10. An image reader comprising:

an image sensor unit including a light source, a light guide that guides light from the light source and linearly emits light to a subject to be illuminated, an image-forming element that forms an image of light from the illuminated subject on a photoelectric conversion element, a memory circuit that stores plural pieces of reference data to be a reference illuminance of an image region across the illuminated subject according to respective temperature conditions, a white reference provided at positions that are at opposite ends of the image-forming element in a longitudinal direction and cover respective areas external to the image region across the illuminated subject, a white reference data generation circuit that reads light reflected from the white reference means by the photoelectric conversion element and for generating white reference data that represents a white reference illuminance, a correction data generation circuit that calculates a correction coefficient for the image region across the illuminated subject by adopting reference data capable of being approximated to the plural pieces of reference data as correction data that represents a white reference illuminance on the basis of the white reference data, and a correction circuit that corrects the image data on the basis of the correction coefficient; and a conveying path configured to convey the subject to be illuminated past the image sensor unit, wherein the light guide is made of a material having a region in which transmittance is not constant with respect to wavelength, and wherein the light source includes at least one of light emission wavelengths in the region of the light guide in which transmittance is not constant and light emission wavelengths in proximity to the region in which transmittance is not constant.

11. An image reader comprising:

an image sensor unit including a light source, a light guide that guides light from the light source and linearly emits light to a subject to be illuminated, an image-forming element that forms an image of light from the illuminated subject on a photoelectric conversion element, a memory circuit that stores reference data to be a reference illuminance of an image region across the illuminated subject, a white reference provided at a position that is at an opposite side end of the image-forming element in a longitudinal direction away from the light source and covers an area external to the image region across the illuminated subject, a white reference data generation circuit that reads light reflected from the white reference means by the photoelectric conversion element and for generating white reference data that represents a white reference illuminance, a correction data generation circuit that generates correction data that represents a white reference illuminance of the image region across the illuminated subject on the basis of the white reference data, a comparison circuit that calculates a correction coefficient from the correction data and the reference data, and a correction circuit that corrects the image data on the basis of the correction coefficient; and a conveying path configured to convey the subject to be illuminated past the image sensor unit, wherein the light guide is made of a material having a region in which transmittance is not constant with respect to wavelength, and wherein the light source includes at least one of light emission wavelengths in the region of the light guide in which transmittance is not constant and light emission wavelengths in proximity to the region in which transmittance is not constant.

12. An image reader comprising:

an image sensor unit including a light source, a light guide that guides light from the light source and linearly emits light to a subject to be illuminated, an image-forming element that forms an image of light from the illuminated subject on a photoelectric conversion element, a memory circuit that stores plural pieces of reference data to be a reference illuminance of an image region across the illuminated subject according to respective temperature conditions, a white reference provided at a position that is at an opposite side end of the image-forming element in a longitudinal direction away from the light source and covers an area external to the image region across the illuminated subject, a white reference data generation circuit that reads means for reading light reflected from the white reference means by the photoelectric conversion element and for generating white reference data that represents a white reference illuminance, a correction data generation circuit that calculates a correction coefficient for the image region across the illuminated subject by adopting reference data capable of being approximated to the plural pieces of reference data as correction data that represents a white reference illuminance on the basis of the white reference data, and a correction circuit that corrects the image data on the basis of the correction coefficient, a conveying path configured to convey the subject to be illuminated past the image sensor unit, wherein the light guide is made of a material having a region in which transmittance is not constant with respect to wavelength, and wherein the light source includes at least one of light emission wavelengths in the region of the light guide in which transmittance is not constant and light emission wavelengths in proximity to the region in which transmittance is not constant.

* * * * *